United States Patent
Guenther

(10) Patent No.: US 8,104,998 B2
(45) Date of Patent: Jan. 31, 2012

(54) HYDRAULIC ELEVATION APPARATUS AND METHOD

(76) Inventor: Ross Guenther, Penn Valley, CA (US)

(*) Notice: Subject to any disclaimer, the term of this patent is extended or adjusted under 35 U.S.C. 154(b) by 0 days.

(21) Appl. No.: 12/760,196

(22) Filed: Apr. 14, 2010

(65) Prior Publication Data

US 2010/0303560 A1    Dec. 2, 2010

Related U.S. Application Data

(60) Continuation-in-part of application No. 12/648,912, filed on Dec. 29, 2009, which is a division of application No. 11/437,973, filed on May 18, 2006, now Pat. No. 7,661,910.

(51) Int. Cl.
    *B65G 51/30* (2006.01)

(52) U.S. Cl. .......... 406/180; 406/73; 406/131; 406/146; 406/149; 406/179; 405/8

(58) Field of Classification Search .................. 406/73, 406/127, 128, 129, 130, 131, 146, 147, 148, 406/149, 150, 192, 197, 179, 180; 405/8; 299/18
    See application file for complete search history.

(56) References Cited

U.S. PATENT DOCUMENTS

| | | | | |
|---|---|---|---|---|
| 272,722 | A * | 2/1883 | Loud | 175/10 |
| 307,861 | A * | 11/1884 | Leonard et al. | 405/8 |
| 3,232,672 | A | 2/1966 | Gardner, Jr. | |
| 3,371,965 | A | 3/1968 | MacLellan | |
| 3,485,534 | A | 12/1969 | Wanzenberg et al. | |
| 3,753,303 | A | 8/1973 | Holzenberger et al. | |
| 3,982,789 | A | 9/1976 | Funk | |
| 4,114,954 | A | 9/1978 | Pasieka et al. | |
| 4,154,484 | A | 5/1979 | Holzenberger | |
| 4,247,229 | A | 1/1981 | Evans | |
| 4,437,799 | A * | 3/1984 | Liu et al. | 406/198 |
| 4,466,759 | A * | 8/1984 | Sweeney et al. | 406/15 |
| 5,201,877 | A * | 4/1993 | Relin et al. | 406/85 |
| 5,209,626 | A * | 5/1993 | Lichti et al. | 414/331.03 |
| 5,411,358 | A * | 5/1995 | Garric et al. | 414/277 |
| 5,923,428 | A * | 7/1999 | Woodworth | 356/623 |
| 5,959,568 | A * | 9/1999 | Woolley | 342/42 |
| 6,178,670 | B1 | 1/2001 | Susman et al. | |
| 6,600,418 | B2 * | 7/2003 | Francis et al. | 340/572.1 |
| 6,629,018 | B2 * | 9/2003 | Mondie et al. | 700/228 |
| 6,634,832 | B2 * | 10/2003 | Reid | 406/50 |
| 6,747,560 | B2 * | 6/2004 | Stevens, III | 340/572.4 |
| 6,860,042 | B2 | 3/2005 | Hutchinson et al. | |
| 6,952,628 | B2 * | 10/2005 | Prutu | 700/228 |
| 7,063,657 | B2 * | 6/2006 | Okutsu et al. | 588/250 |
| 7,082,344 | B2 * | 7/2006 | Ghaffari | 700/115 |
| 7,133,742 | B2 * | 11/2006 | Cruysen et al. | 700/226 |
| 7,222,738 | B1 * | 5/2007 | Stockard | 209/552 |

(Continued)

*Primary Examiner* — Joseph A Dillon, Jr.
(74) *Attorney, Agent, or Firm* — Pillsbury Winthrop Shaw Pittman LLP

(57) ABSTRACT

The hydraulic transportation apparatus and method of the present invention incorporate a multiple chamber framework internally disposed preferably within at least one single shaft structure, which facilitates movement of object transport containers within the multiple chamber framework. Preferably, fluid elevation is employed to elevate and lower object transport containers and their contents within the multiple chamber framework. Each single shaft structure may be constructed from an existing rehabilitated shaft, or a newly drilled shaft. The present invention may be utilized in vertical or incline lifting environments, and an auxiliary hoist chamber may be incorporated into the multiple chamber framework for use as an alternative to, or in conjunction with, elevating objects by employing fluid elevation. The present invention may be employed in a variety of heavy lifting scenarios, including underground mining or in above ground lifting environments.

36 Claims, 15 Drawing Sheets

U.S. PATENT DOCUMENTS

| | | |
|---|---|---|
| 7,233,840 B2 * | 6/2007 | Schiesser et al. ............. 700/230 |
| 7,321,305 B2 * | 1/2008 | Gollu ......................... 340/572.1 |
| 7,336,177 B2 * | 2/2008 | Onderko et al. ........... 340/572.1 |
| 7,572,638 B2 * | 8/2009 | Pressman et al. ............... 436/47 |
| 7,598,863 B2 * | 10/2009 | King et al. ................. 340/572.1 |
| 7,661,910 B2 * | 2/2010 | Guenther ..................... 406/142 |

* cited by examiner

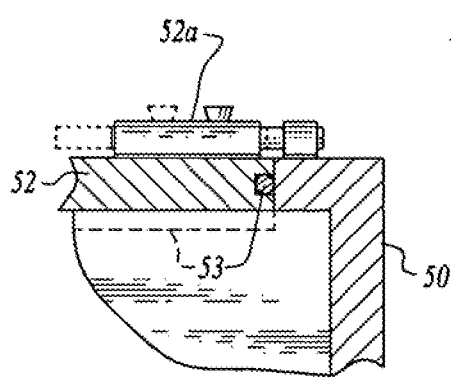
*Fig. 3a*
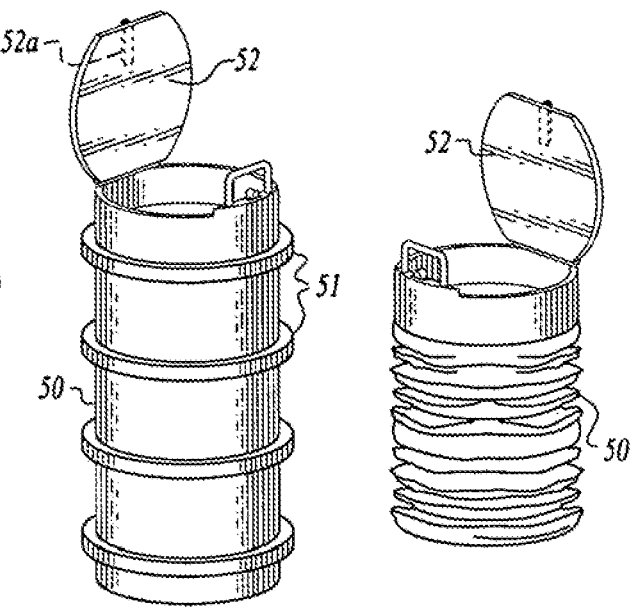
*Fig. 3*  *Fig. 4*
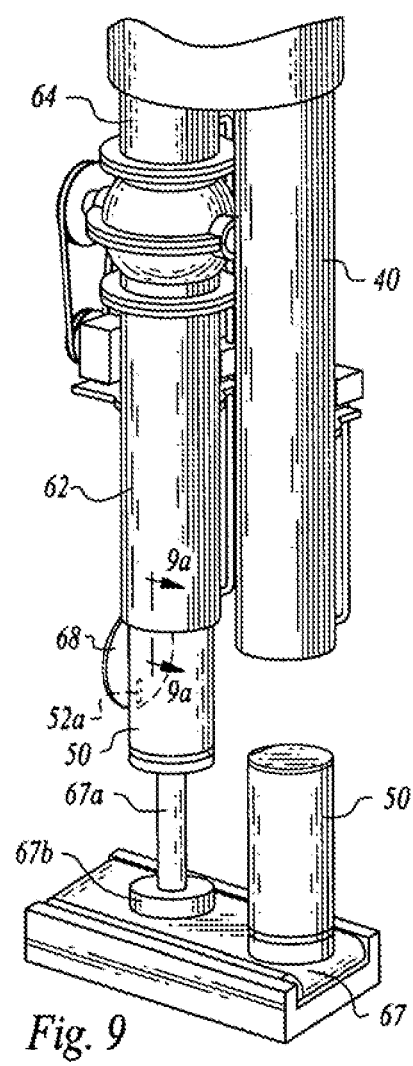
*Fig. 9*
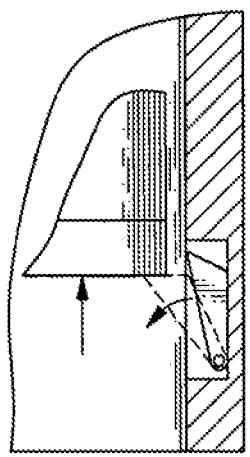
*Fig. 9a*

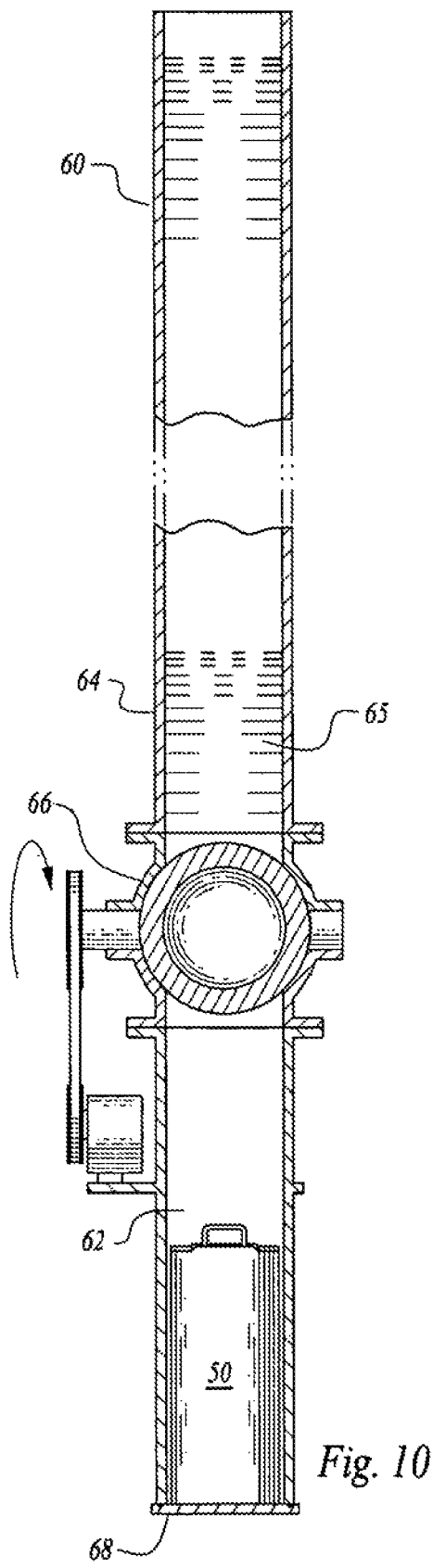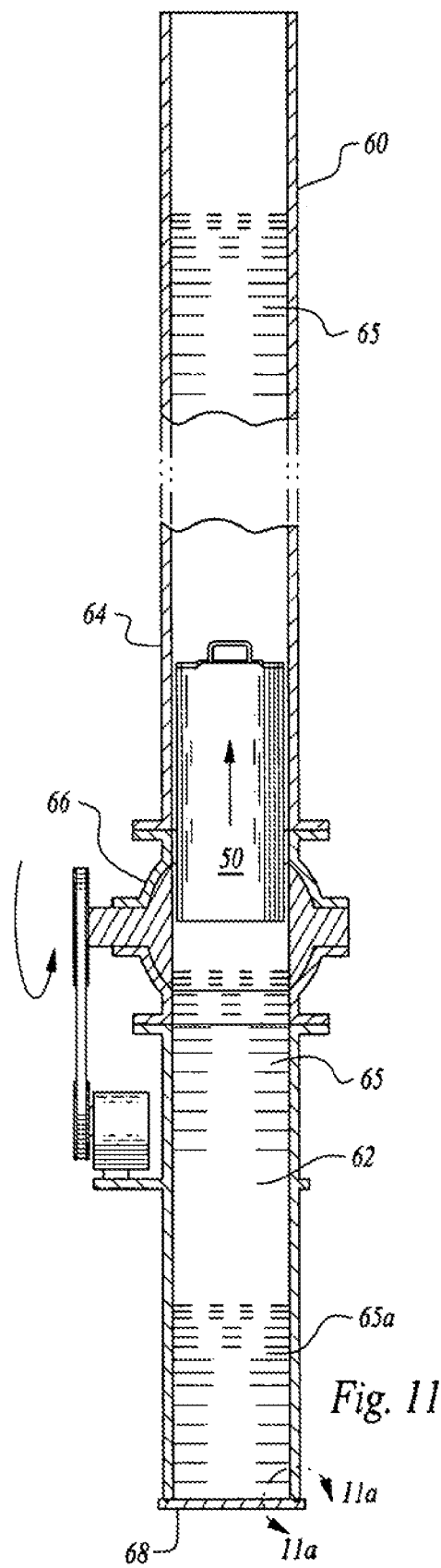
Fig. 10
Fig. 11

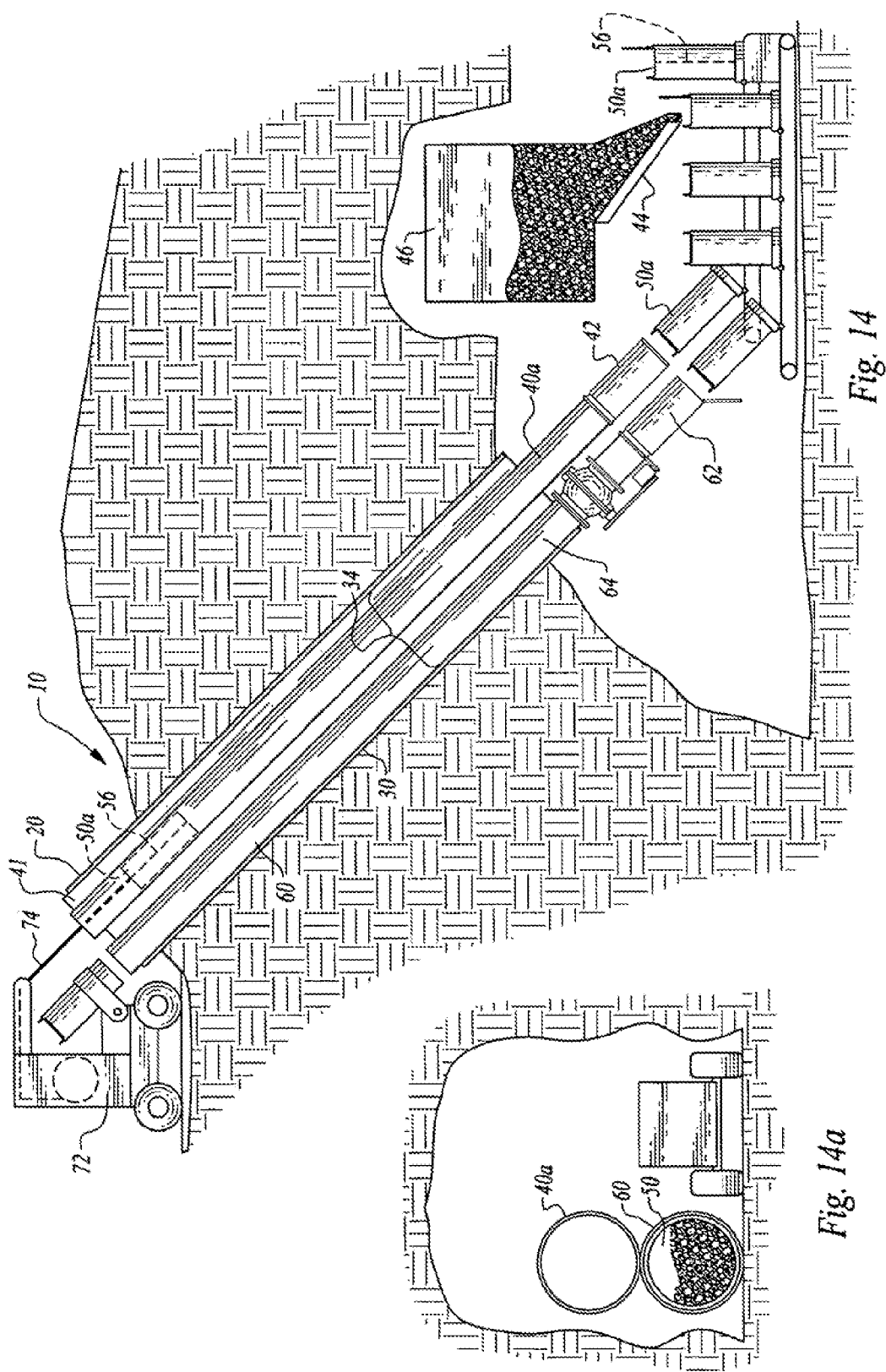

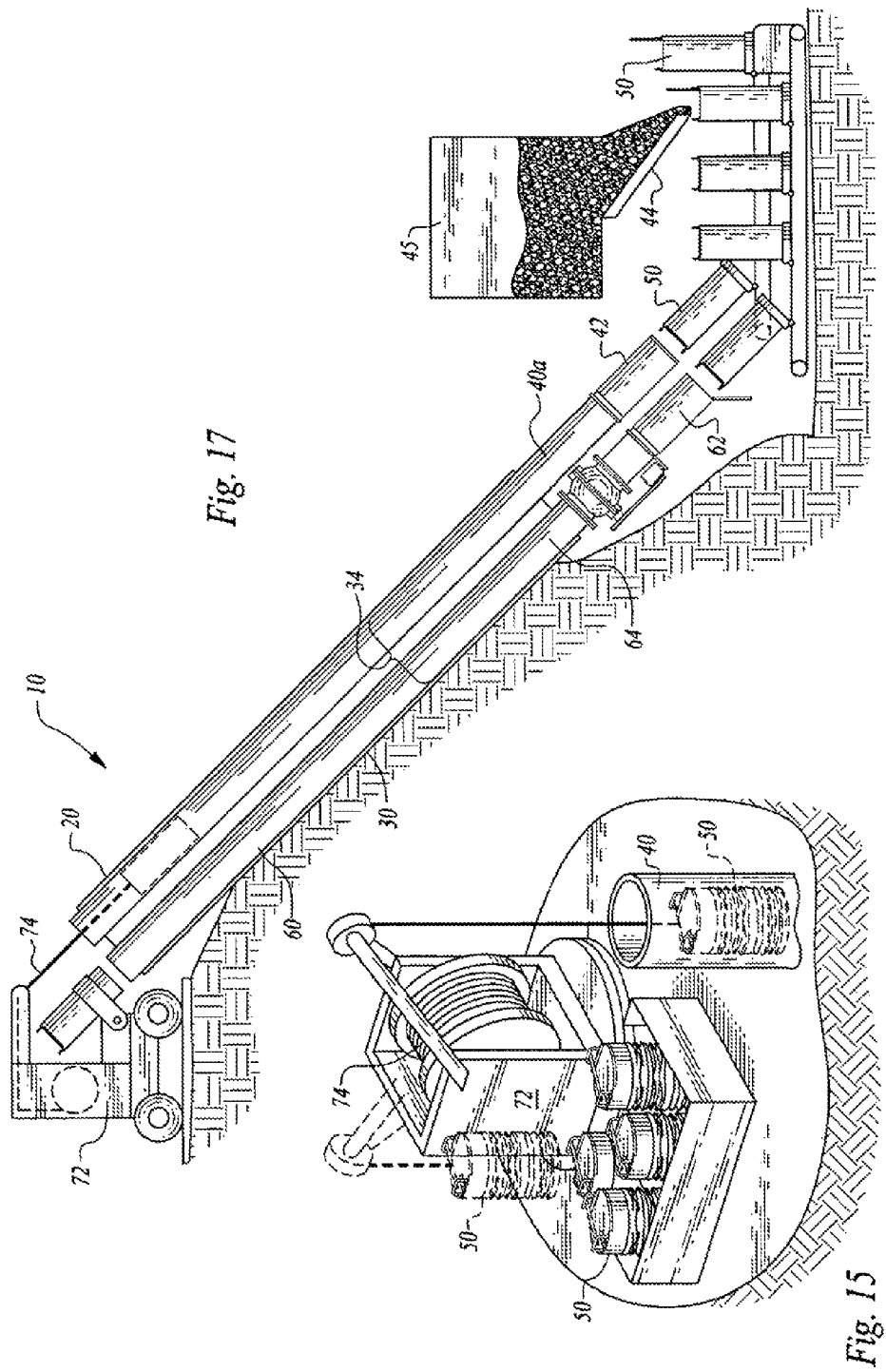

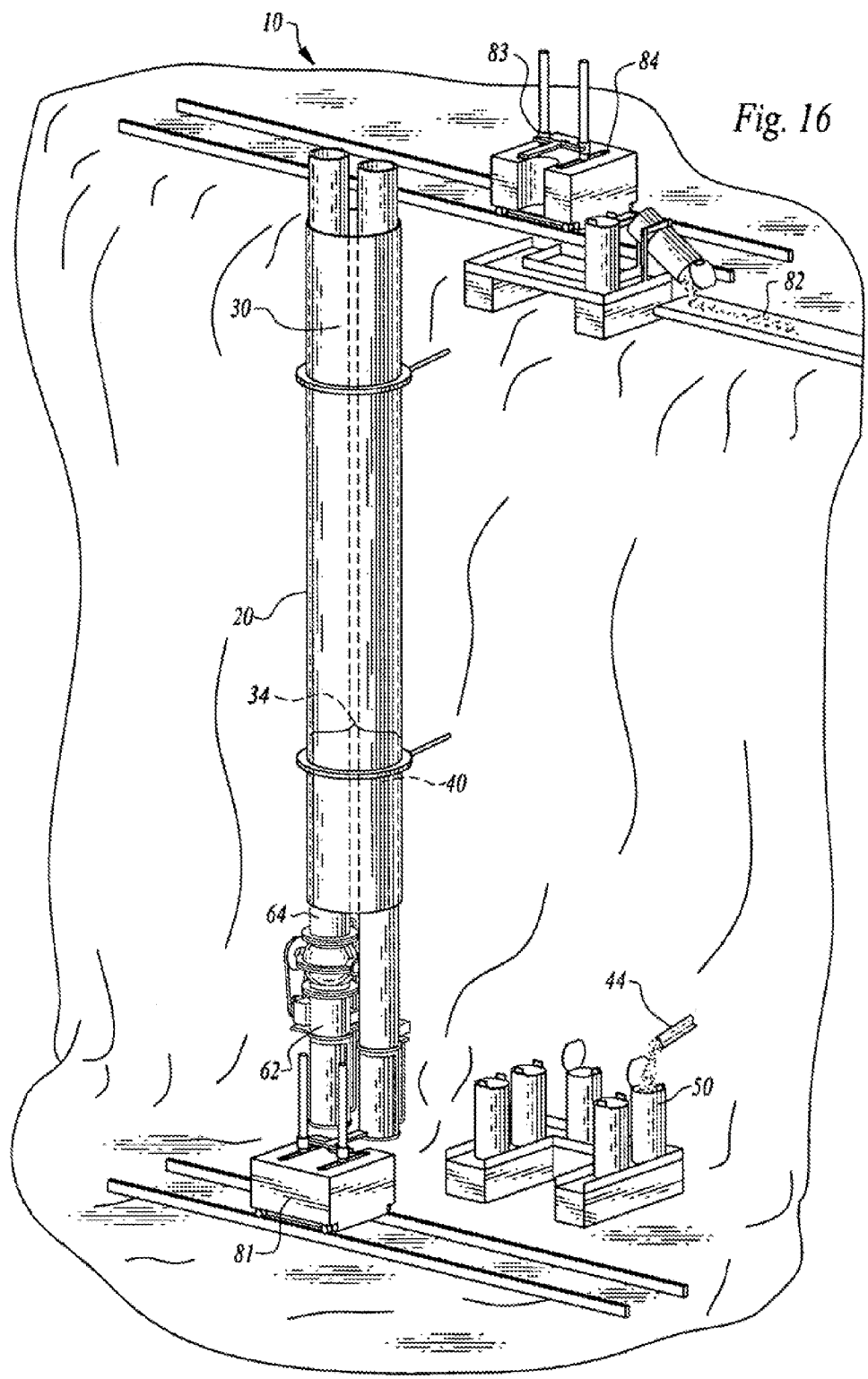

HYDRAULIC ELEVATION APPARATUS AND METHOD

CROSS REFERENCE TO RELATED APPLICATIONS

This application is a Continuation-in-part of U.S. patent application Ser. No. 12/648,912, filed on Dec. 29, 2009, currently pending, which is a Divisional of U.S. patent application Ser. No. 11/437,973, now U.S. Pat. No. 7,661,910, the contents of both of which are incorporated herein by reference in their entireties.

BACKGROUND OF THE INVENTION

1. Field of the Invention

The present invention generally relates to an apparatus and method for lifting objects by flotation from beneath the earth's surface or to elevations above the earth's surface within at least one single shaft structure. More specifically, the present invention provides an apparatus and method for conveying objects within at least one multiple chamber single shaft structure positioned beneath the earth's surface or above the earth's surface, and elevating and descending objects within the shaft structure by employing fluid buoyancy.

2. Description of the Related Art

A persistent and formidable challenge in mining and related industries is implementing cost effective, efficient and reliable devices and methods for lifting objects either from beneath the earth's surface or to elevations above the earth's surface. For instance, currently within the underground mining industry, demonstrably inefficient and relatively costly methods and devices are employed to lift rock and other objects from subsurface levels to above the earth's surface. In vertical lifting environments, using wire rope hoisting for elevating loads of objects and lowering containers (from which objects were emptied) is a frequently employed method of transporting those objects from and/or containers to beneath the earth's surface. However, hoisting materials either individually or by load in existing vertical shafts is often inordinately space consuming, time consuming, costly, and consequently inefficient. Vertical shaft hoisting generally requires an entire shaft compartment to lift a single load contained in a bucket or similar container, and additionally requires considerable time to lower the container back down the same shaft compartment to complete the hoisting cycle of a single container. Moreover, vertical shaft hoist lifting devices and methods require the use of relatively expensive equipment, including hoists, wire rope, and corresponding mechanical parts, which are not only high maintenance, but also demand frequent replacement as a consequence of normal wear and tear. In high frequency or high load density mining conditions, repair and replacement costs often increase exponentially. The relatively high costs of energy required to operate vertical hoist shafts are largely a function of load density, and the attendant amount of energy required to offset the friction of various moving parts required to elevate each load of materials.

Existing methods for lifting objects within shafts positioned at an incline either beneath or above the earth's surface involve shortcomings similar to those previously identified with respect to vertical lifting environments. For instance, conveyors, trams, trucks and other such haulage equipment are commonly employed to incline lift objects within multiple shaft structures. Such incline lifting equipment often requires even more moving parts and mechanical operation in comparison to vertical hoisting equipment, and often includes significant manual labor efforts to complete each mining cycle.

Apparent attempts to alleviate some of the disadvantages associated with existing vertical and incline lifting technologies have resulted in devices and methods embodying similarly disadvantageous characteristics, and in some instances substantially more problematic operational components. U.S. Pat. No. 4,247,229 to Evans represents one such attempt. The Evans Patent discloses an underground mining method and apparatus employing at least two separate downwardly descending shafts connected by at least one lateral opening incorporating a series of conveyors and moveable doors to facilitate container movement underground. One shaft is required to receive an ore carrier, which passes through a moveable door opening into a compartment for loading, and through a second moveable door opening into the second shaft. The second shaft is required to elevate the loaded ore carrier to the earth's surface. The apparent structural, operational and economic demands of employing two or more separate shafts to complete a mining cycle are most likely significant. Ostensibly, not only must at least two separate shafts be drilled or existing parallel shafts located and rehabilitated, but each shaft must be linked by the elaborate lateral opening connecting the multiple shafts, which presumably incorporates expensive equipment and corresponding maintenance and repair.

Thus, a need exists for a lifting apparatus and method capable of elevating animate and inanimate objects from beneath the earth's surface or to locations above the earth's surface and accordingly returning containers for reloading, preferably within a single shaft structure employing fluid buoyancy to elevate and lower containers and corresponding objects.

SUMMARY OF THE INVENTION

The hydraulic elevation and lowering (or returning) apparatus and method of the present invention overcome the functional and operational limitations currently prevalent in existing heavy lifting equipment, which impede operational efficiency, including with respect to underground mining and above ground lifting environments. The hydraulic elevation and lowering apparatus and method of the present invention may be employed preferably within at least one single shaft structure, which may be constructed from an existing rehabilitated shaft or a newly drilled shaft positioned beneath or above the earth's surface.

The present invention incorporates a chamber framework internally disposed preferably within at least one single shaft structure, which facilitates movement of an object transport container within the chamber framework to remove objects from, or deliver objects to, locations beneath or above the earth's surface. The chamber framework may incorporate a tripartite, dual, or otherwise multiple cavity structure, or in some embodiments may include a single cavity structure.

In a first embodiment of the present invention, the hydraulic elevation apparatus is used in a vertical lifting environment which may be either below ground or above ground. The chamber framework internally disposed within a single shaft structure includes a tripartite cavity structure, which incorporates a vertically positioned cavity creating a return chamber, a vertically positioned cavity creating a delivery chamber, and a vertically positioned cavity creating an auxiliary hoist chamber. For underground mining operations, one or more of the delivery, return and auxiliary chambers may include unlined bored hole in rock or lined hole with cement or other similar materials. The return and auxiliary hoist chambers are laterally positioned on either side of the delivery chamber. Empty, collapsed or filled transport containers may be lowered within the return chamber via a wire rope hoist or similar device, or may be lowered using negative fluid buoyancy such that the containers sink in a fluid within the return chamber. In the auxiliary hoist chamber, multiple empty transport containers may be returned simultaneously in one hoisting cycle by employing collapsible, stacked, or tapered containers fitting inside each other.

The lower section of the return chamber is operatively positioned with respect to a transport channel and storage bin containing ore or other objects. The transport channel facilitates transport container loading while the transport container remains within the return chamber. The transport container may be removed from the return chamber for loading, and subsequently placed back into the return chamber for further transport.

The delivery chamber laterally positioned adjacent to the return chamber includes a lower chamber section and an upper chamber section, between which a fluid control valve is operatively positioned. The lower chamber section of the delivery chamber includes a lower chamber hatch, which is remotely opened and closed to facilitate entry and retention of the transport container within the return chamber. The upper chamber section of the delivery chamber contains a fluid, such as water, which is permitted controlled entry into the lower chamber section to facilitate elevating the container from within the lower chamber section, through the upper chamber section, and eventually to the top of the delivery chamber for removal. The fluid control valve positioned within the delivery chamber controls fluid flow from the upper chamber section into the lower chamber section of the delivery chamber.

The auxiliary hoist chamber positioned adjacent to the delivery chamber includes a transport container operatively connected to a pulley mechanism or other surface hoist device, and facilitates lifting the transport container within the chamber framework without employing fluid elevation. The auxiliary hoist chamber may be employed as an alternative, or in addition to, elevating objects by employing fluid elevation.

A second embodiment of the apparatus of the present invention, which may be positioned either below ground or above ground, employs a dual cavity structure within the internally disposed chamber framework, which includes a return chamber and delivery chamber. The dual cavity structure includes a return chamber wherein transport containers may be lowered within the chamber framework via wire rope hoist, pulley, or other such movement mechanisms, or may be lowered using negative fluid buoyancy such that the containers sink in a fluid within the return chamber. Transport containers may be loaded or unloaded while the transport container remains within the return chamber, or by removing and replacing the transport container for loading or unloading. Transport containers are then guided to and placed within the delivery chamber for elevation within the chamber framework.

In third and fourth embodiments of the present invention, the hydraulic elevation apparatus is used in an incline lifting environment, which may be either below ground or above ground. At least one shaft structure is positioned at an incline either beneath or above the earth's surface. The chosen incline angle of the shaft structure may vary depending upon any number of relevant factors, such as the external environmental or subsurface conditions existing at the site of lifting, the size, shape and weight of objects being moved within the chamber framework, and other such factors that may influence the desired angle of an incline angled shaft.

In a third embodiment, the chamber framework internally disposed within the inclined single shaft structure includes a dual cavity structure, which incorporates a cavity creating a return chamber, and a cavity creating a delivery chamber positioned adjacent to the return chamber. The return chamber may optionally contain a ventilation channel to provide a source of circulated air as the transport container descends within the return chamber. As previously described, a transport channel and an object storage bin may be operatively positioned in relation to the lower section of the return chamber, and objects such as ore may be funneled from the storage bin through the transport channel and into the transport container while the transport container remains within, or in close communication with, the return chamber. Alternatively, the transport container may be removed from the return chamber for loading, and subsequently replaced within the return chamber for further transport.

In an incline lifting scenario, the transport container may include an internal partition, which maintains transported objects along the lower longitudinal portion of the transport container during transport, and diminishes contact between the outside of the transport container and the inside of the delivery chamber walls as the transport container and its contents are lifted within the delivery chamber. As previously described, once loaded, the transport container is guided into and secured within the lower chamber section of the delivery chamber. The fluid control valve is positioned between the lower chamber section and upper chamber section of the delivery chamber, and controls fluid entry into the lower chamber section, which facilitates elevating the transport container within the chamber framework.

In a fourth embodiment of the present invention, the hydraulic elevation apparatus includes a tripartite cavity structure, which incorporates a return chamber, delivery chamber, and an optional auxiliary hoist chamber as discussed above.

A dual, tripartite, or otherwise multiple chamber framework may be employed in the embodiments described above.

In fifth and sixth embodiments of the invention, hydraulic lowering or returning is used to return the containers that carried objects upward in the delivery chamber for reloading. In a fifth embodiment of the invention, the hydraulic elevation and lowering apparatus, which may be used vertically or at an inclination and which may be used above or below ground, includes a transport container containing animate or inanimate objects, or a liquid, and one transportation chamber for transporting the transport container upward and downward in a fluid internally disposed within the transportation chamber. In this embodiment, the transportation chamber is used for both elevating the transport container having objects, and lowering the empty or at least partially-filled transport container, using fluid buoyancy. Accordingly, a fluid is disposed within the transportation chamber which is employed for flotation elevation and sinking lowering of the transport containers within the transportation chamber. The transportation chamber may include a vertically disposed cavity.

Transport containers may include a moveable lid configured to seal the transport container or may include a flotation device connected to an unsealed container. Further, transport containers may be loaded or unloaded as discussed above. A loader used for loading objects into the transport containers may be operatively engaged with the transportation chamber and includes an object storage and a channel configured to transfer objects from the storage through the channel into the transport container. The apparatus may further include a guiding device configured to guide the transport container such that the guiding device is horizontally disposed within a bottom portion of a conveyor in operative communication with the transportation chamber and the transport container.

In one embodiment, the apparatus includes an auxiliary chamber laterally disposed to the transportation chamber for transporting objects within the at least one shaft structure using wire rope hoisting or similar methods. A fluid controller internally disposed within the transportation chamber may be configured to engage the transport container and control the amount of fluid in the transportation chamber to elevate and lower the transport container within the transportation chamber. The fluid controller may further include a lower chamber internally disposed within the transportation chamber, and a valve configured to control the amount of the fluid in the lower chamber. A location device may be operatively connected with each of the transportation containers to send, receive, or send and receive location information of a transport container to one or more of other location devices (connected to other containers) and/or to a monitoring station.

In a sixth embodiment, the hydraulic apparatus includes a dual cavity structure having a delivery chamber and a return chamber, both of which are fluid-filled for transporting animate or inanimate objects contained in a transport container. The apparatus of this embodiment may be used in a vertical or an inclined lifting environment, and may be used for above or below ground operations. The delivery chamber may be used for elevating the transport containers by flotation in a internally disposed within the delivery chamber. The return chamber of the apparatus may be used for lowering or returning transport containers by sinking the empty or at least partially-filled containers in a fluid (same or different than the fluid used in the delivery chamber) disposed within the return chamber. The return chamber may further include a control gate to regulate the downward movement of the transport container within the return chamber.

The apparatus may further include a loader operatively engaged with the return chamber and comprises an object storage and a channel configured to transfer objects from the storage through the channel into the transport container. A guiding device may be configured to guide the transport container, such that the guiding device is horizontally disposed within a bottom portion of a conveyor in operative communication with the return chamber, the transport container, and the delivery chamber. An auxiliary chamber laterally disposed to the delivery chamber or the return chamber may be included in the apparatus, thereby making the apparatus a tripartite cavity structure.

A delivery device including a cavity laterally disposed to the return chamber may be configured to receive the transport container from the return chamber and the delivery device may be further equipped to facilitate elevation of the transport container into the delivery chamber. A fluid controller may be internally disposed within the delivery chamber, the return chamber, or both, and may be configured to control the amount of fluid in the chamber within which the fluid controller is disposed to elevate or lower the transport container. The fluid controller may include a lower chamber internally disposed within the chamber within which the fluid controller is disposed, and a valve configured to control the amount of the fluid in the lower chamber.

Transport containers may include a moveable lid configured to seal the transport container or may include a flotation device connected to an unsealed container. A location device may be operatively connected with each of the transportation containers to send, receive, or send and receive location information of a transport container to one or more of other location devices (connected to other containers) and/or to a monitoring station.

The functional aspects of the present invention promote operational and cost efficiency in heavy lifting environments, including underground mining and above ground lifting scenarios. The apparatus and method of the present invention may be employed within an existing rehabilitated or newly drilled single shaft structure. The apparatus and method of the present invention may be employed in multiple shaft structures to increase operational capacity at any given site of operation.

In a seventh embodiment, the hydraulic apparatus includes a location device to locate and track the position of a transport container, e.g. within a delivery, return or transportation chamber. The apparatus of this embodiment may include a transport container containing animate or inanimate objects, or a liquid; a transportation chamber for transporting the transport container within the transportation chamber; and a location device releasably secured (or operatively connected) with the transport container to send, receive, or send and receive location information of the transport container to and from a monitoring station. The location information of the location device (and therefore, of the transport container) may include longitudinal, latitudinal, or elevational position of the transport container within the transportation chamber. The location device may further include a receiver, a processing device and a transmitter. The receiver receives a location request message including an identification code from, e.g., the monitoring station. The processing device may store an unique identification code in a memory and determines a location of the location device using, e.g., a geographical position system (GPS) device. The processing device may further compare the received identification code with the unique identification code, and if the received identification code matches the unique identification code, the processing device generates a location signal for transmission through a transmitter to the monitoring station directly, or indirectly through a relay. The location device may further include an emergency unit for generating an emergency signal for transmission to the monitoring station upon detection of an emergency situation.

The present invention also includes methods of lifting objects by flotation employing the apparatus of the invention.

In one embodiment, a method of the present invention may be employed to deliver or remove objects either within or above the earth's surface. A loaded, empty or collapsed transport container is deposited into the return chamber and descends within the return chamber into the lower chamber section of the return chamber. Preferably, transport containers are lowered within the return chamber via a hoist, pulley, or other such mechanism. The transport container may then be emptied or loaded by removing the transport container from the return chamber for appropriate handling. Alternatively, the transport container may be loaded with objects such as ore by engaging the transport container with a transport channel attached to an object storage bin as discussed above, and funneling objects from the storage bin through the transport channel and into the transport container, which is positioned within the return chamber. The transport container is then sealed and guided laterally from the return chamber to the delivery chamber by a guiding device, such as a ram, adjustable latch or other mechanical attachment device.

Once the transport container is guided into and secured within the lower chamber section of the delivery chamber and the lower chamber hatch is sealed, the fluid control valve is adjusted to permit fluid from the upper chamber section of the delivery chamber to flow into the lower chamber section. As fluid enters the lower chamber section of the delivery chamber, the transport container floats upward within the delivery chamber. When the transport container floats up past the fluid control valve, the fluid control valve is adjusted to stop water flow into the lower chamber section. The transport container subsequently floats to the top of the delivery chamber, and may be connected to a pulley or similar shuttle tram to remove the transport container from the delivery chamber, and guide the transport container to a stockpile or other designated location for unloading. The transport container may then be reintroduced into the return chamber for another cycle of transport.

In another embodiment, a method of transporting objects or their containers includes transporting a transport container containing animate or inanimate objects, or a liquid in a fluid internally disposed within one transportation chamber. In this embodiment, the transport container is elevated by flotation and lowered by sinking in the fluid within the one transportation chamber employing fluid buoyancy.

In yet another embodiment, a method of transporting objects or their containers includes loading animate or inanimate objects, or a liquid into a transport container, elevating the transport container by flotation in a first fluid internally disposed within a delivery chamber, and lowering the transport container by sinking in a second fluid internally disposed within a return chamber. The first and second fluids may be the same or different.

In this embodiment, the return chamber includes a control gate to regulate the downward movement of the transport container within the return chamber.

OBJECTS OF THE INVENTION

It is a primary object of the present invention to provide a new and novel hydraulic elevation apparatus, which may be employed preferably within at least one single shaft structure.

It is a further object of the present invention to provide a corresponding method that compliments the inventive hydraulic elevation apparatus.

It is a further object of the present invention to provide an apparatus and method as delineated herein, which are relatively easy to construct and employ, lend themselves to heavy lifting techniques and environments, and can be utilized with a relatively high degree of efficiency and a relatively low degree of operational and functional maintenance.

It is a further object of the present invention to provide an apparatus and method as characterized above, which employ a multiple chamber framework to transport objects beneath or above the earth's surface, and fluid elevation to lift the objects within the multiple chamber framework.

Viewed from a first vantage point, it is an object of the present invention to provide an apparatus for transporting animate or inanimate objects employing flotation elevation comprising, in combination: at least one single shaft structure; a transport container; and conveying means internally disposed within said at least one single shaft structure for conveying said transport container within said at least one single shaft structure and elevating said transport container by flotation.

Viewed from a second vantage point, it is an object of the present invention to provide an apparatus for transporting animate or inanimate objects employing flotation elevation comprising, in combination: at least one single shaft structure; a transport container; and conveying means internally disposed within said at least one single shaft structure for conveying said transport container within said at least one single shaft structure and elevating said transport container by flotation, wherein said conveying means comprises a return means for introducing said transport container into said at least one single shaft structure, a loading means for loading objects into said transport container, and a delivery means for elevating said transport container by applying fluid to elevate said transport container within said delivery means.

Viewed from a third vantage point, it is an object of the present invention to provide an apparatus for transporting animate or inanimate objects employing flotation elevation comprising, in combination: at least one single shaft structure; a transport container; and conveying means internally disposed within said at least one single shaft structure for conveying said transport container within said at least one single shaft structure and elevating said transport container by flotation, wherein said conveying means comprises a return means for introducing said transport container into said at least one single shaft structure, a loading means for loading objects into said transport container, and a delivery means for elevating said transport container by applying fluid to elevate said transport container within said delivery means wherein said return means comprises a vertically disposed cavity within said at least one single shaft structure through which said transport container descends in order to deliver or retrieve objects.

Viewed from a fourth vantage point, it is an object of the present invention to provide an apparatus for transporting animate or inanimate objects employing flotation elevation comprising, in combination: at least one single shaft structure; a transport container; and conveying means internally disposed within said at least one single shaft structure for conveying said transport container within said at least one single shaft structure and elevating said transport container by flotation, wherein said conveying means comprises a return means for introducing said transport container into said at least one single shaft structure, a loading means for loading objects into said transport container, and a delivery means for elevating said transport container by applying fluid to elevate said transport container within said delivery means, wherein said loading means is operatively engaged with said return means and comprises an object storage means and channel means in operative communication with said return means such that objects are transferred from said storage means through said channel means into said transport container.

Viewed from a fifth vantage point, it is an object of the present invention to provide an apparatus for transporting animate or inanimate objects employing flotation elevation comprising, in combination: at least one single shaft structure; a transport container; and conveying means internally disposed within said at least one single shaft structure for conveying said transport container within said at least one single shaft structure and elevating said transport container by flotation, wherein said conveying means comprises a return means for introducing said transport container into said at least one single shaft structure, a loading means for loading objects into said transport container, and a delivery means for elevating said transport container by applying fluid to elevate said transport container within said delivery means, wherein said delivery means comprises a cavity means laterally disposed to said return means within said at least one single shaft structure, and wherein said delivery means receives said transport container from said return means and wherein said delivery means is equipped to facilitate elevation of said transport container by flotation within said delivery means.

Viewed from a sixth vantage point, it is an object of the present invention to provide an apparatus for transporting animate or inanimate objects employing flotation elevation comprising, in combination: at least one single shaft structure; a transport container; and conveying means internally disposed within said at least one single shaft structure for conveying said transport container within said at least one single shaft structure and elevating said transport container by flotation, wherein said conveying means comprises a return means for introducing said transport container into said at least one single shaft structure, a loading means for loading objects into said transport container, and a delivery means for elevating said transport container by applying fluid to elevate said transport container within said delivery means, wherein said delivery means comprises a cavity means laterally disposed to said return mean within said at least one single shaft structure, and wherein said delivery means receives said transport container from said return means and wherein said delivery means is equipped to facilitate elevation of said transport container by flotation within said delivery means, wherein said delivery means further comprises a fluid control means for controlling the amount of fluid engaging said transport container in order to elevate said transport container within said delivery means of said at least one single shaft structure.

Viewed from a seventh vantage point, it is an object of the present invention to provide an apparatus for transporting animate or inanimate objects employing flotation elevation comprising, in combination: at least one single shaft structure; a transport container; and conveying means internally disposed within said at least one single shaft structure for conveying said transport container within said at least one single shaft structure and elevating said transport container by flotation, wherein said conveying means comprises a return means for introducing said transport container into said at least one single shaft structure, a loading means for loading objects into said transport container, and a delivery means for elevating said transport container by applying fluid to elevate said transport container within said delivery means, wherein said transport container comprises a moveable lid means to allow for loading or unloading said transport container, and for sealing said transport container.

Viewed from an eighth vantage point, it is an object of the present invention to provide an apparatus for transporting animate or inanimate objects employing flotation elevation comprising, in combination: a single shaft structure; a transport container; a conveying means internally disposed within said single shaft structure for conveying said transport container within said single shaft structure; and fluid control means internally disposed within said conveying means for controlling the volume of fluid within said single shaft structure to elevate objects contained in said transport container.

Viewed from a ninth vantage point, it is an object of the present invention to provide an apparatus for transporting animate or inanimate objects employing flotation elevation comprising, in combination: a single shaft structure; a transport container; a conveying means internally disposed within said single shaft structure for conveying said transport container within said single shaft structure; and fluid control means internally disposed within said conveying means for controlling the volume of fluid within said single shaft structure to elevate objects contained in said transport container, wherein said conveying means comprises a return chamber means for introducing said transport container within said single shaft structure, a loading means for loading objects into said transport container, a guiding means for guiding said transport container within said conveying means, and a delivery chamber means for elevating said transport container, and wherein said fluid control means is operatively attached to said delivery chamber means.

Viewed from a tenth vantage point, it is an object of the present invention to provide an apparatus for transporting animate or inanimate objects employing flotation elevation comprising, in combination: a single shaft structure; a transport container; a conveying means internally disposed within said single shaft structure for conveying said transport container within said single shaft structure; and fluid control means internally disposed within said conveying means for controlling the volume of fluid within said single shaft structure to elevate objects contained in said transport container, wherein said conveying means comprises a return chamber means for introducing said transport container within said single shaft structure, a loading means for loading objects into said transport container, a guiding means for guiding said transport container within said conveying means, and a delivery chamber means for elevating said transport container, and wherein said fluid control means is operatively attached to said delivery chamber means, wherein said guiding means is horizontally disposed within a bottom portion of said conveying means in operative communication with said return chamber means, said transport container, and said deliver chamber means, and whereby said guiding means operatively attaches to said transport container and laterally moves said transport container into operative communication with said delivery chamber means.

Viewed from an eleventh vantage point, it is an object of the present invention to provide an apparatus for transporting animate or inanimate objects employing flotation elevation comprising, in combination: a single shaft structure; a transport container; a conveying means internally disposed within said single shaft structure for conveying said transport container within said single shaft structure; and fluid control means internally disposed within said conveying means for controlling the volume of fluid within said single shaft structure to elevate objects contained in said transport container, wherein said conveying means comprises a return chamber means for introducing said transport container within said single shaft structure, a loading means for loading objects into said transport container, a guiding means for guiding said transport container within said conveying means, and a delivery chamber means for elevating said transport container, and wherein said fluid control means is operatively attached to said delivery chamber means, wherein said fluid control means comprises a lower chamber section means internally disposed within said delivery chamber means for engaging said transport container prior to elevation of said transport container, and valve means for controlling the amount of fluid that enters into said lower chamber means to contact said transport container and elevate said transport container within said delivery chamber.

Viewed from a twelfth vantage point, it is an object of the present invention to provide an apparatus for transporting animate or inanimate objects employing flotation elevation comprising, in combination: at least one single shaft structure; a chamber framework internally disposed within said at least one single shaft structure; a fluid control means internally disposed within said chamber framework; and a transport container.

Viewed from a thirteenth vantage point, it is an object of the present invention to provide an apparatus for transporting animate or inanimate objects employing flotation elevation comprising, in combination: at least one single shaft structure; a chamber framework internally disposed within said at least one single shaft structure; a fluid control means internally disposed within said chamber framework; and a transport container, wherein said chamber framework comprises a return chamber for introducing said transport container within said single shaft structure, and a laterally disposed delivery chamber for elevating said transport container from within said single shaft structure.

Viewed from a fourteenth vantage point, it is an object of the present invention to provide an apparatus for transporting animate or inanimate objects employing flotation elevation comprising, in combination: at least one single shaft structure; a chamber framework internally disposed within said at least one single shaft structure; a fluid control means internally disposed within said chamber framework; and a transport container, wherein said chamber framework comprises a return chamber for introducing said transport container within said single shaft structure, and a laterally disposed delivery chamber for elevating said transport container from within said single shaft structure, wherein said return chamber comprises controlling means for adjusting the speed at which said transport container descends within said return chamber, wherein said return chamber is operatively engaged with means for introducing objects into said transport container while said transport container is within said return chamber, and wherein said return chamber is operatively engaged with means for guiding said transport container into operative contact with said delivery chamber.

Viewed from a fifteenth vantage point, it is an object of the present invention to provide an apparatus for transporting animate or inanimate objects employing flotation elevation comprising, in combination: at least one single shaft structure; a chamber framework internally disposed within said at least one single shaft structure; a fluid control means internally disposed within said chamber framework; and a transport container, wherein said chamber framework comprises a return chamber for introducing said transport container within said single shaft structure, and a laterally disposed delivery chamber for elevating said transport container from within said single shaft structure, wherein said return chamber comprises controlling means for adjusting the speed at which said transport container descends within said return chamber, wherein said return chamber is operatively engaged with means for introducing objects into said transport container while said transport container is within said return chamber, and wherein said return chamber is operatively engaged with means for guiding said transport container into operative contact with said delivery chamber, wherein said delivery chamber comprises means for securely engaging said transport container after said transport container is guided into operative communication with said delivery chamber, and means for controlling the amount of fluid engaging said transport container within said delivery chamber to achieve sufficient buoyancy to float said transport container upward within said delivery chamber.

Viewed from a sixteenth vantage point, it is an object of the present invention to provide an apparatus for transporting animate or inanimate objects employing flotation elevation comprising, in combination: at least one single shaft structure; a chamber framework internally disposed within said at least one single shaft structure; a fluid control means internally disposed within said chamber framework; and a transport container, wherein said chamber framework comprises a return chamber for introducing said transport container within said single shaft structure, and a laterally disposed delivery chamber for elevating said transport container from within said single shaft structure, further comprising an auxiliary chamber means laterally disposed to said delivery chamber or said return chamber for transporting objects within said at least one single shaft structure by hoisting.

Viewed from a seventeenth vantage point, it is an object of the present invention to provide an apparatus for transporting animate or inanimate objects employing flotation elevation comprising, in combination: a single shaft structure; a chamber framework internally disposed within said single shaft structure comprising a return chamber, a laterally disposed delivery chamber and an auxiliary chamber laterally positioned to said delivery chamber; a transport container; an object storage bin connected to an object transport channel in operative communication with said return chamber, whereby objects are transferred from said storage bin through said transport channel into said transport container while said transport container is positioned within said return chamber; and a fluid control valve in operative communication with said delivery chamber to control the amount of fluid that engages said transport container to elevate said transport container within said delivery chamber.

Viewed from an eighteenth vantage point, it is an object of the present invention to provide a method of transporting animate or inanimate objects employing flotation elevation, the steps including: (A) depositing a transport container within a return chamber internally disposed within a single shaft structure; (B) loading or unloading said transport container; (C) guiding said transport container into a delivery chamber internally disposed within said single shaft structure; and (D) introducing fluid into a lower chamber section of said delivery chamber to elevate said transport container within said delivery chamber.

Viewed from a nineteenth vantage point, it is an object of the present invention to provide a method of transporting animate or inanimate objects employing flotation elevation, the steps including: (A) depositing a transport container within a return chamber internally disposed within a single shaft structure; (B) loading or unloading said transport container; (C) guiding said transport container into a delivery chamber internally disposed within said single shaft structure; and (D) introducing fluid into a lower chamber section of said delivery chamber to elevate said transport container within said delivery chamber, also including in step (B) loading said transport container within said return chamber by transferring objects from an externally disposed object container through a transport channel into said transport container.

Viewed from a twentieth vantage point, it is an object of the present invention to provide a method of transporting animate or inanimate objects employing flotation elevation, the steps including: (A) depositing a transport container within a return chamber internally disposed within a single shaft structure; (B) loading or unloading said transport container; (C) guiding said transport container into a delivery chamber internally disposed within said single shaft structure; and (D) introducing fluid into a lower chamber section of said delivery chamber to elevate said transport container within said delivery chamber, also including in step (B) removing said transport container from within said return chamber, loading or unloading said transport container, and replacing said transport container into said return chamber.

Viewed from a twenty-first vantage point, it is an object of the present invention to provide a method of transporting animate or inanimate objects employing flotation elevation, the steps including: (A) depositing a transport container within a return chamber internally disposed within a single shaft structure; (B) loading or unloading said transport container; (C) guiding said transport container into a delivery chamber internally disposed within said single shaft structure; and (D) introducing fluid into a lower chamber section of said delivery chamber to elevate said transport container within said delivery chamber, also including in step (C) operatively connecting said transport container to a laterally mobile conveyor and directing said conveyor to move said transport container into operative communication with said delivery chamber.

Viewed from a twenty-second vantage point, it is an object of the present invention to provide a method of transporting animate or inanimate objects employing flotation elevation, the steps including: (A) depositing a transport container within a return chamber internally disposed within a single shaft structure; (B) loading or unloading said transport container; (C) guiding said transport container into a delivery chamber internally disposed within said single shaft structure; and (D) introducing fluid into a lower chamber section of said delivery chamber to elevate said transport container within said delivery chamber, also including in step (D) adjusting a valve operatively connected to said delivery chamber to introduce fluid into said lower chamber section of said delivery chamber in a sufficient amount to elevate said transport container above said valve, and adjusting said valve to terminate fluid flow into said lower chamber section of said delivery chamber after said transport container floats above said valve.

Viewed from a twenty-third vantage point, it is an object of the present invention to provide a method for transporting animate or inanimate objects employing flotation elevation, the steps including: (A) depositing a transport container into a first chamber of a multiple chamber framework internally disposed within at least one single shaft structure; (B) loading or unloading said transport container; and (C) introducing said transport container into a second chamber of said multiple chamber framework to elevate said transport container by flotation within said second chamber.

Viewed from a twenty-fourth vantage point, it is an object of the present invention to provide a method for transporting animate or inanimate objects employing flotation elevation, the steps including: (A) depositing a transport container into a first chamber of a multiple chamber framework internally disposed within at least one single shaft structure; (B) loading or unloading said transport container; and (C) introducing said transport container into a second chamber of said multiple chamber framework to elevate said transport container by flotation within said second chamber, wherein the step of depositing said transport container into said first chamber further includes controlling the speed at which said transport container descends within said first chamber.

Viewed from a twenty-fifth vantage point, it is an object of the present invention to provide a method for transporting animate or inanimate objects employing flotation elevation, the steps including: (A) depositing a transport container into a first chamber of a multiple chamber framework internally disposed within at least one single shaft structure; (B) loading or unloading said transport container; and (C) introducing said transport container into a second chamber of said multiple chamber framework to elevate said transport container by flotation within said second chamber, wherein the step of loading said transport container further includes introducing objects into said transport container while said transport container remains within said first chamber.

Viewed from a twenty-sixth vantage point, it is an object of the present invention to provide a method for transporting animate or inanimate objects employing flotation elevation, the steps including: (A) depositing a transport container into a first chamber of a multiple chamber framework internally disposed within at least one single shaft structure; (B) loading or unloading said transport container; and (C) introducing said transport container into a second chamber of said multiple chamber framework to elevate said transport container by flotation within said second chamber, wherein the step of introducing said transport container into said second chamber further includes adjusting the amount of fluid within said second chamber to facilitate floatation.

Viewed from a twenty-seventh, it is an object of the present invention to provide a method for transporting animate or inanimate objects employing flotation elevation, the steps including: (A) depositing a transport container into a first chamber of a multiple chamber framework internally disposed within at least one single shaft structure; (B) loading or unloading said transport container; and (C) introducing said transport container into a second chamber of said multiple chamber framework to elevate said transport container by flotation within said second chamber, wherein the step of loading or unloading said transport container further includes removing said transport container from said first chamber, loading or unloading objects, and replacing said transport container into said first chamber for further transport.

Viewed from a twenty-eighth vantage point, it is an object of the present invention to provide a method for transporting animate or inanimate objects employing flotation elevation, the steps including: (A) depositing a transport container into a multiple chamber framework internally disposed within at least one single shaft structure; (B) loading or unloading said transport container; and (C) elevating said transport container upward within said multiple chamber framework.

Viewed from a twenty-ninth vantage point, it is an object of the present invention to provide a method for transporting animate or inanimate objects employing flotation elevation, the steps including: (A) depositing a transport container into a multiple chamber framework internally disposed within at least one single shaft structure; (B) loading or unloading said transport container; and (C) elevating said transport container upward within said multiple chamber framework, wherein the step of elevating said transport container within said multiple chamber framework further includes employing fluid elevation to elevate said transport container within said multiple chamber framework.

Viewed from a thirtieth vantage point, it is an object of the present invention to provide a method for transporting animate or inanimate objects employing flotation elevation, the steps including: (A) depositing a transport container into a multiple chamber framework internally disposed within at least one single shaft structure; (B) loading or unloading said transport container; and (C) elevating said transport container upward within said multiple chamber framework, wherein the step of elevating said transport container within said multiple chamber framework further includes employing a hoisting device to elevate said transport container within said multiple chamber framework.

BRIEF DESCRIPTION OF THE DRAWINGS

FIG. 3 depicts a perspective view of a transport container of the present invention.

FIG. 3a depicts a side view of a hatch and seal of the present invention.

FIG. 4 depicts a perspective view of a transport container of the present invention in a collapsible form.

FIG. 9 depicts placement of a transport container into a delivery chamber for flotation according to the present invention.

FIG. 9a depicts a chamber lock according to the present invention.

FIG. 10 depicts a front full cross section of a delivery chamber of the present invention showing a valve in a closed position, water in a upper chamber section, and a transport container in a lower chamber section according to the present invention.

FIG. 11 depicts a front full cross section of a delivery chamber of the present invention showing a valve in an opened position, water in a lower chamber section, and a transport container floating upward above a valve according to the present invention.

FIG. 14 depicts a side view of an incline elevation of the present invention showing a multiple chamber single shaft structure including a dual cavity structure.

FIG. 14a depicts a cross-section of the present invention showing a diesel truck at the lower right.

FIG. 15 depicts a perspective view of multiple transport containers and a hoist of the present invention for lowering transport containers within a chamber.

FIG. 16 depicts a perspective view of the present invention in an above ground vertical environment.

FIG. 17 depicts a side view of the present invention in an angled above ground orientation employing a haulage vehicle to transport containers within a chamber.

DETAILED DESCRIPTION OF PREFERRED EMBODIMENTS

Elevation apparatus (10) of the present invention employs fluid to elevate animate or inanimate objects from beneath the earth's surface or to a point above the earth's surface within preferably at least one single shaft elevation structure (20), which may be positioned downward into the earth's interior, or positioned above the earth's surface. Shaft elevation structure (20) incorporates an internally disposed chamber framework (30) by which objects are transported within shaft elevation structure (20). Shaft elevation structure (20) is typically a single shaft structure, but may consist of multiple shaft structures incorporating chamber framework (30). Chamber framework (30) may be constructed within shaft elevation structure (20) by various shaft rehabilitation techniques, and may be incorporated into existing shaft structures. Chamber framework (30) may alternatively be constructed within newly drilled shaft structures.

Figures 1, 2:
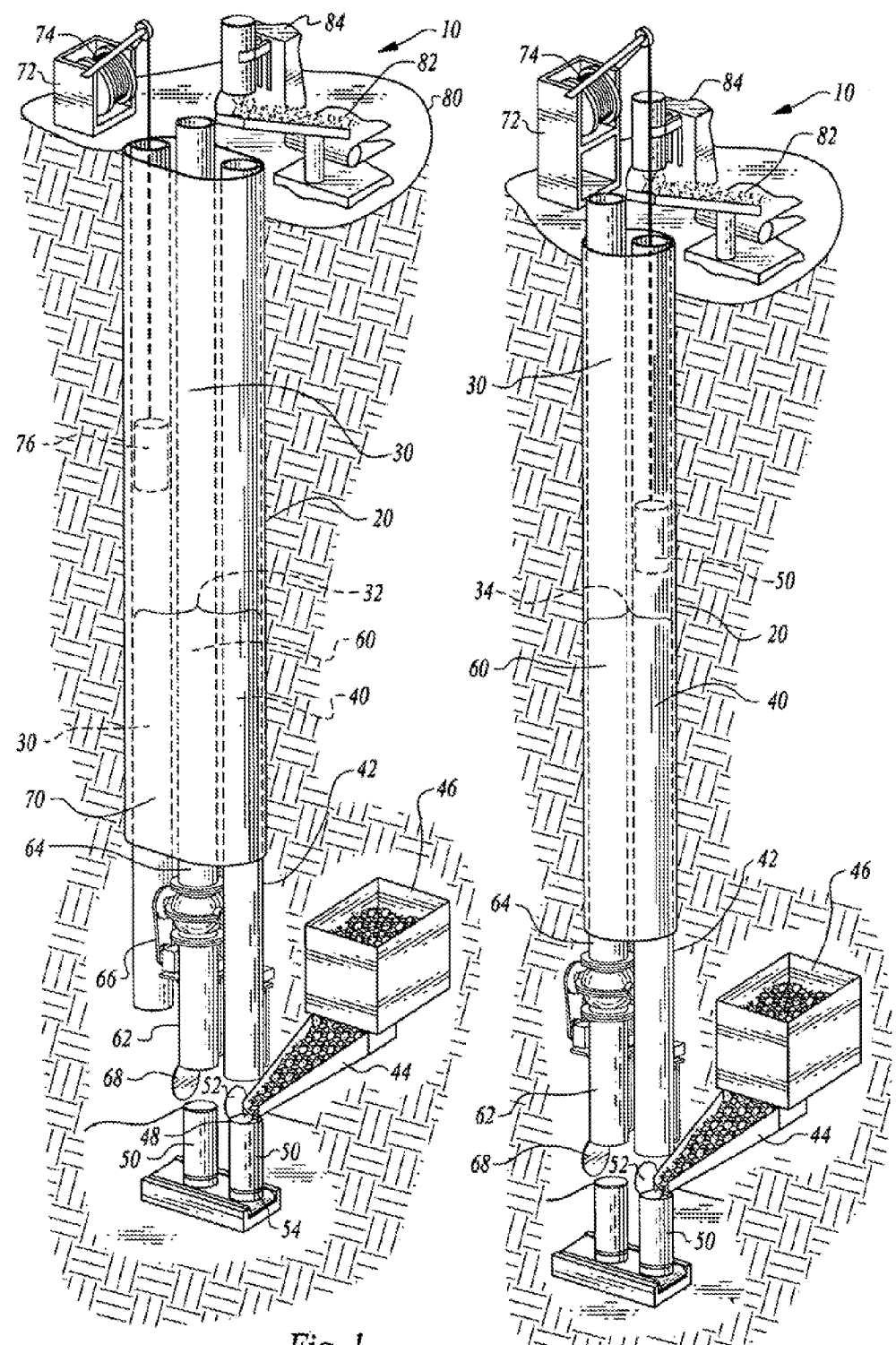
FIG. 1 depicts a perspective view of the present invention showing a multiple chamber single shaft structure including a tripartite cavity structure with an auxiliary hoist chamber.
FIG. 2 depicts a perspective view of the present invention showing a multiple chamber shaft structure including a dual cavity structure.

FIGS. 1 and 2 depict preferred embodiments of elevation apparatus (10) in a vertical lifting orientation. FIG. 1 shows elevation apparatus (10) employing a chamber framework (30) comprising a tripartite cavity structure (32) positioned within shaft elevation structure (20). Tripartite cavity structure (32) of chamber framework (30) includes a return chamber (40), a transport container (50), a delivery chamber (60), and an auxiliary hoist chamber (70). Auxiliary hoist chamber (70) may be optionally positioned laterally and adjacent to delivery chamber (60). A surface hoist (72) comprising a pulley mechanism (74) and an operatively attached transport container (76) is employed within auxiliary hoist chamber (70) as an optional lifting mechanism to transport objects within chamber framework (30).

FIG. 2 shows elevation apparatus (10) employing a chamber framework (30) comprising a dual cavity structure (34) positioned within shaft elevation structure (20). Dual cavity structure (34) of chamber framework (30) includes a return chamber (40), a transport container (50), and a delivery chamber (60). As depicted in FIG. 2, transport container (50) may be lowered within return chamber (40) via a hoist, pulley, or similar such mechanism, or as will be described later, transport container (50) may be hydraulically lowered by sinking in a fluid disposed within return chamber (40). Return chamber (40) includes a lower section (42), operatively positioned in relation to a transport channel (44). The outwardly extended top portion of transport channel (44) is connected to bin (46), which stores material to be elevated within chamber framework (30). Transport channel (44) is operatively positioned to engage transport container (50), which travels within return chamber (40) and delivery chamber (60) as described below.

As shown in FIGS. 3-4, transport container (50) is constructed with a top end hatch (52) and a bottom end hatch (not shown). Transport container (50) may be rectangular or cylindrical in shape, constructed in a collapsible form (FIG. 4), or otherwise suitably fitted to facilitate vertical or horizontal movement within chamber framework (30). Transport container (50) may be constructed from an array of durable materials conducive to airtight sealing and elevation by flotation, including plastic, synthetic polymers, polymer blends and the like, and metals, all characterized by imperviousness to rugged use and inert both to the materials being transported and its environs. Transport container (50) may include reinforcing ribs (51) interiorly and/or exteriorly disposed. Where transport container (50) is configured to be flexible, it is contemplated to compress parallel to its long axis but may compress transverse thereto. Durable elastomers, preferably reinforced with fiber characterized by resistance to chafe and distention include, by way of example, but not limitation: kevlar, boron graphite, fiberglass coated with rubber, neoprene, hypalon, and pvc.

FIG. 3a shows a sealable hatch which may be employed in conjunction with transport container (50). The top end hatch (52) and bottom end hatch (not shown) are constructed to open and close in order to modulate the contents of transport container (50) during use. As depicted if FIGS. 1 and 2, when top end hatch (52) is in an opened position, transport channel (44) operatively engages transport container (50) and funnels objects from bin (46) into transport container (50). As depicted in FIG. 3a, when top end hatch (52) is closed, seal (53) peripherally circumscribes the interface of top end hatch (52) and transport container (50) promulgates buoyancy. Seal (53) can be disposed on either interface surface of top end hatch (52) or transport container (50). In some instances, more than one seal is desired as a function of the pressure differential in and out of transport container (50).

In one embodiment, instead of sealed transport containers as discussed above, transport container (50) include a flotation device connected to an unsealed container. The unsealed container may contain materials or objects in a bucket, cage, wire mesh, or tied to a container. The unsealed materials in such transport container (50) may or may not be adversely affected by fluid pressure generated due to release of fluid in delivery chamber (60). The use of an unsealed container in transport container (50) for mineral processing may provide helpful implosive crushing of rocks with high fluid pressure in the lower part of delivery chamber (60), and helpful micro-explosive breaking of rocks with a decrease of fluid-pressure in the upper part of delivery chamber (60), when the objects are elevated. The crushing pressure on the objects decreases as the objects are elevated (by flotation) in delivery chamber (60), and the pressure is minimum at the surface co-planar with the top end of delivery chamber (60).

Figure 5:
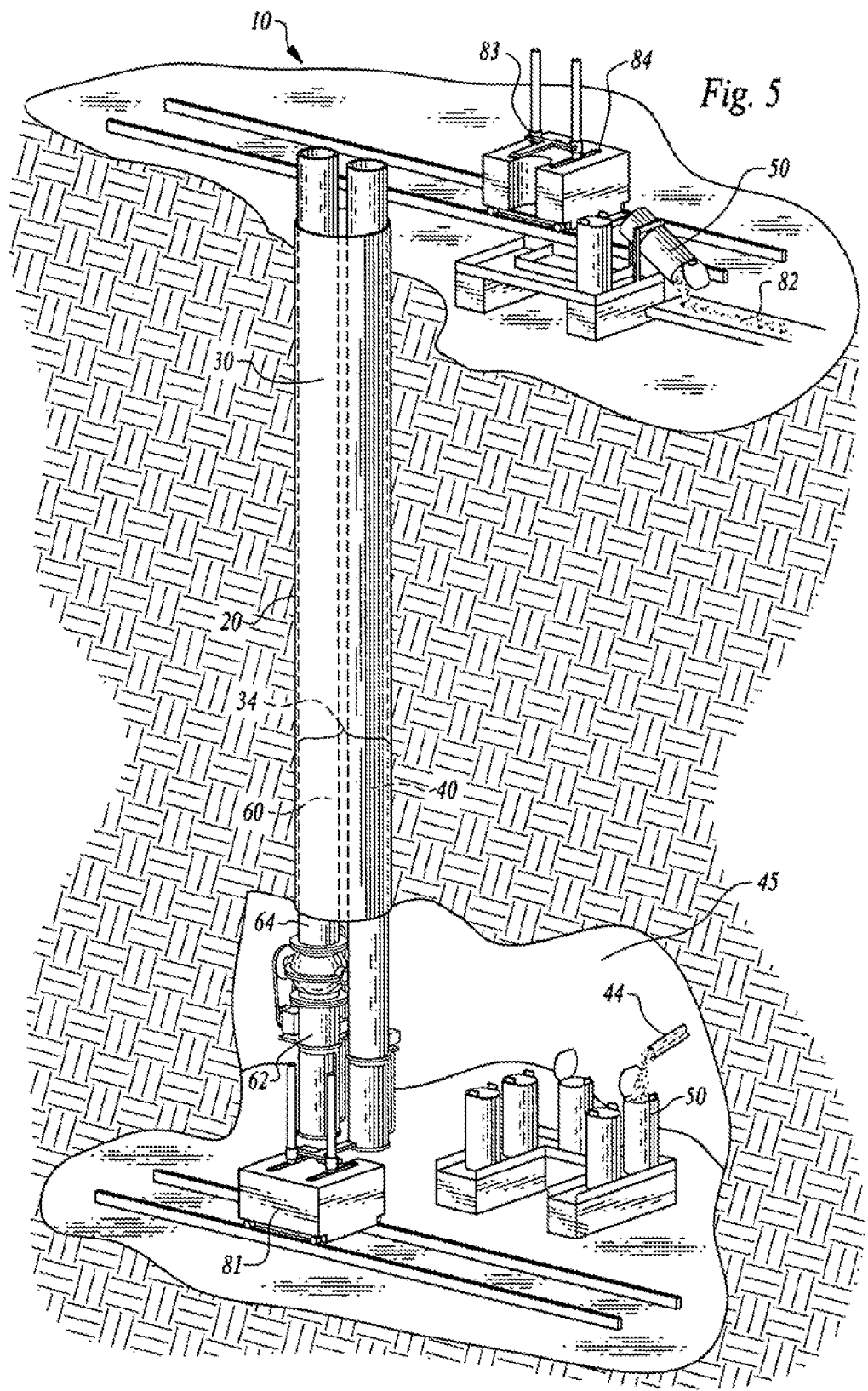
FIG. 5 depicts a perspective view of the present invention showing a multiple chamber single shaft structure including a dual cavity structure.
Figure 6:
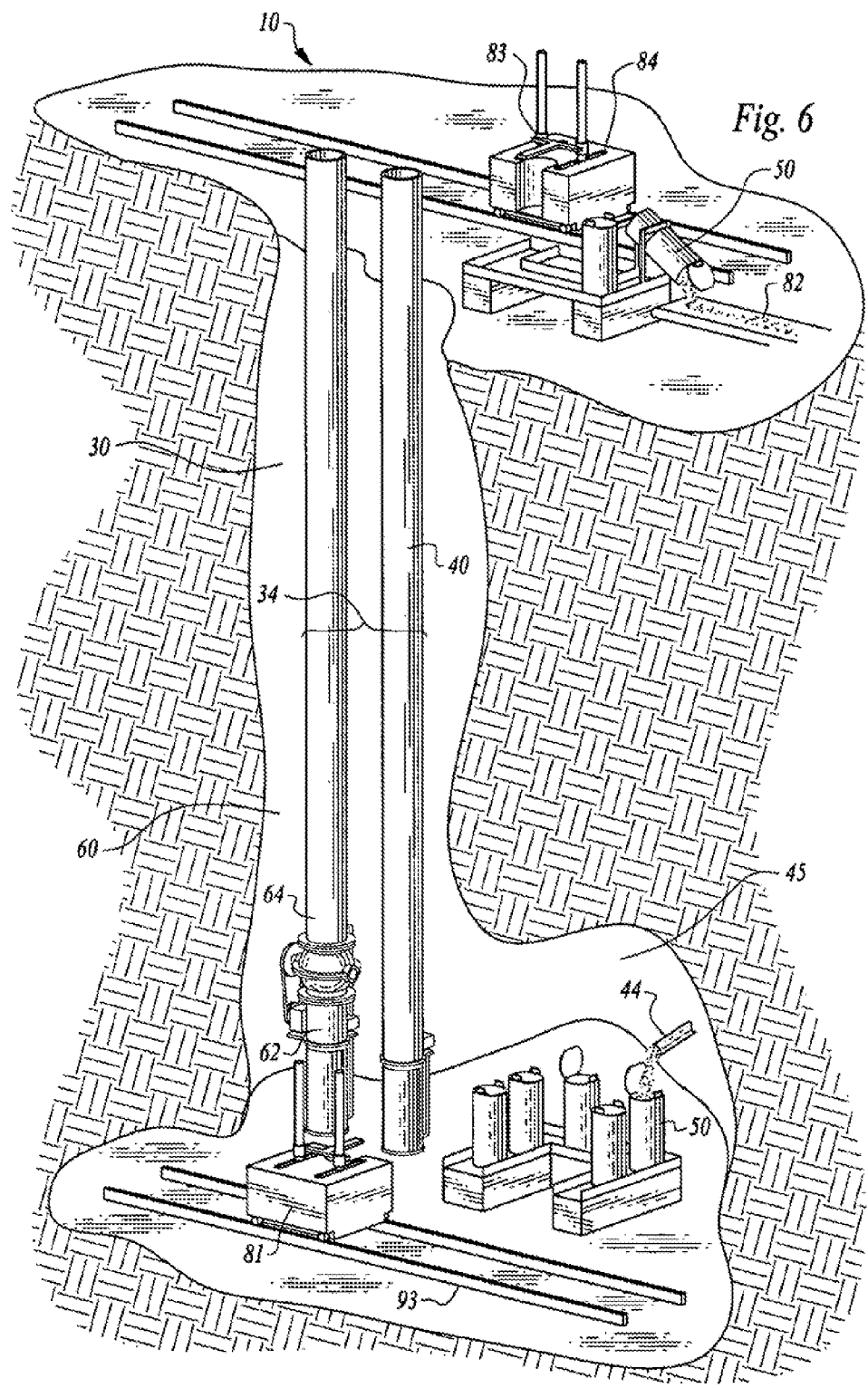
FIG. 6 depicts a perspective view of the present invention showing a multiple chamber single shaft structure including a dual cavity structure.

As shown in FIGS. 5 and 6, return chamber (40) may be operatively engaged with a conveyor mechanism, by which transport container (50) is removed from return chamber (40), loaded with objects, and placed within delivery chamber (60) for further transport. More specifically, transport channel (44) funnels material to an open transport container (50) while lower shuttle tram (81) cycles between return chamber (40) and delivery chamber (60), alternatively transporting and retrieving consecutive transport containers (50). A second upper shuttle tram (84) may be positioned at a higher elevation for dispensing the contents of transport container (50) onto a conveyor (82).

Figure 7:
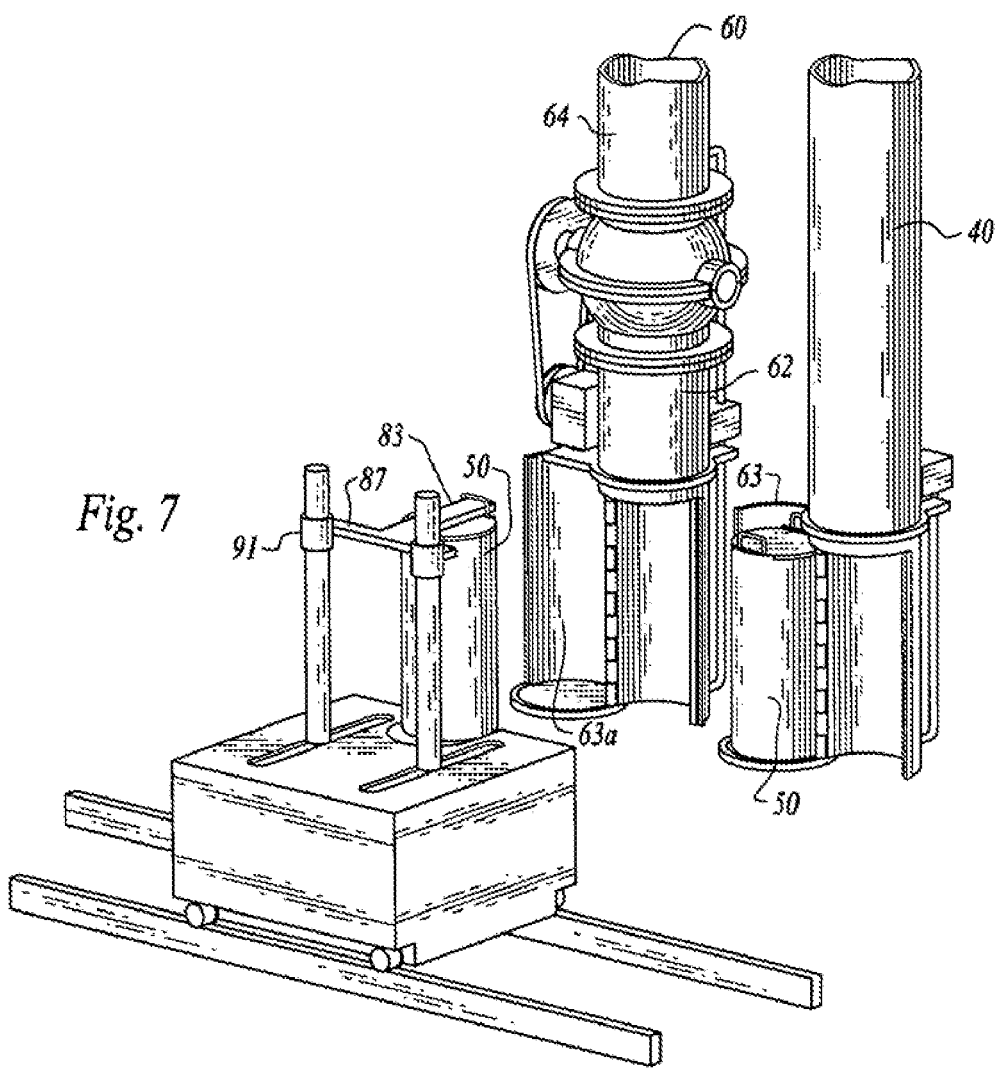
FIG. 7 depicts lateral movement of a transport container for loading or unloading according to the present invention.
Figure 8:
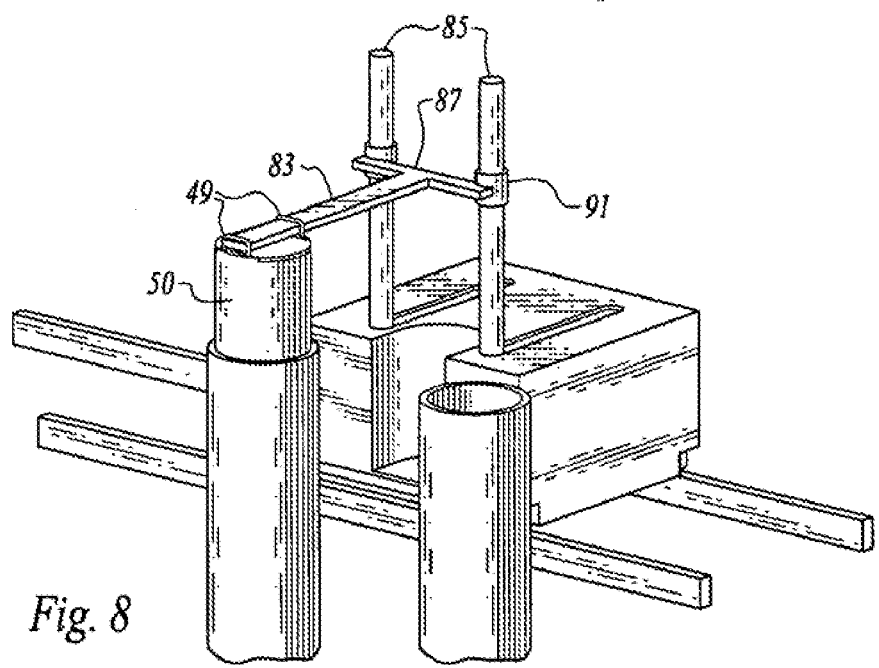
FIG. 8 depicts displacement of a transport container for loading or unloading according to the present invention.
Figure 12:
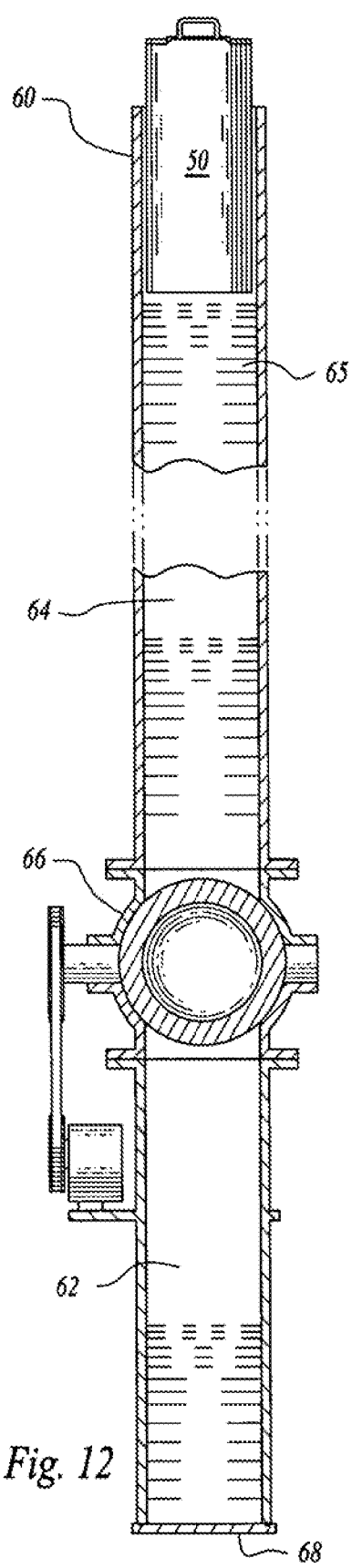
FIG. 12 depicts a front full cross section of a delivery chamber of the present invention showing a valve in a closed position, water in a lower chamber section, and a transport container at the top of the delivery chamber according to the present invention.

As depicted in FIGS. 7 and 8, it is preferred that a tine (83) engage within at least one inverted U-shaped handle operatively coupled to transport container (50) to facilitate movement of transport container (50).

FIG. 8 reflects that tine (83) preferably engages a pair of U-shaped handles (49) diametrically disposed in alignment on a transport container (50) extremity. Transport container (50) is skewered by tine (83) when lower shuttle tram (81) or upper shuttle tram (84) advances in diametric alignment to handles (49). Each shuttle tram has at least one (and preferably two) tine support posts (85) supporting tine (83) via an interconnecting cross piece (87). Tine support posts (85) are constrained within slots (91) and reciprocate to selectively engage handles (49) via tine (83). In this manner, transport containers (50) can be cycled.

As depicted in FIGS. 5 and 6, lower shuttle tram (81) moves transport container (50) from station (45) operatively situated in conjunction with transport channel (44) into position for placement into delivery chamber (60). As depicted in FIG. 7, return chamber (40) may be constructed with an opening portion (63) to release transport container (50), and delivery chamber (60) may be constructed with an opening portion (63a) to receive transport container (50). Opening portions (63) and (63a) may be contoured to envelop transport container (50).

FIG. 9 reflects an alternative technique for delivering transport container (50) to address delivery chamber (60). A belt type conveyor (67) supports each transport container (50) via an interposed extensible ram (67a), which emanates from a housing (67b) supported by, and preferably integrated with, conveyor (67). Transport container (50) is guided into delivery chamber (60) by conveyor (67) and ram (67a) or a similar device for vertically elevating and positioning transport container (50) within delivery chamber (60). Ram (67a) may comprise jacks, screws or hydraulic means to move transport container (50) into delivery chamber (60).

Prior to flotation within delivery chamber (60), transport container (50) may be secured within lower chamber section (62) of delivery chamber (60) by a locking mechanism (not shown). Once transport container (50) floats to the surface through delivery chamber (60), a locking device such as that depicted in FIG. (9a) may be employed to stabilize transport container (50) for removal by upper shuttle tram (84).

As shown in FIGS. 10-13, delivery chamber (60) is constructed with a lower chamber section (62), an upper chamber section (64), and a fluid control valve (66). Lower chamber section (62) may be constructed with a lower chamber hatch (68), which alternatively seals or unseals lower chamber section (62) to control ingress into, and egress from, delivery chamber (60) during operation as more fully explained below. Upper chamber section (64) is constructed with an upper chamber hatch (not shown), which in its closed position seals upper chamber section (64) during the flotation process, and in its opened position permits transport container (50) to exit delivery chamber (60) as more fully set forth below.

As also shown in FIGS. 10-13, fluid control valve (66) is operatively situated within and internally connected to delivery chamber (60), between lower chamber section (62) and upper chamber section (64). Fluid control valve (66) may be constructed from an array of materials, such as plastic, any suitable metal, composite, ceramic or reinforced resin synthetic, keeping in mind durability and an unobstructed through passage during use. Fluid control valve (66) controls fluid flow within delivery chamber (60), and is depicted as a ball valve having a turning stem operatively coupled to a pulley, which is rotationally driven via a motor and belt extending between the pulley and a complemental sheave on the motor. A variety of valve types may be employed in the present invention, such as gate valves and the like, so long as the valve structure does not improperly obstruct fluid or transport container flow through delivery chamber (60).

FIG. 14 shows an alternative embodiment of elevation apparatus (10) of the present invention in an incline lifting orientation. Shaft elevation structure (20) is situated in a sloped orientation to facilitate transporting objects at an angle within chamber framework (30) on a graded incline, as opposed to in a vertical orientation. Chamber framework (30) includes a dual cavity structure (34) including return chamber (40a), delivery chamber (60), and transport container (50a) in operative communication with chamber framework (30). Return chamber (40a) includes a lower section (42) constructed and disposed to facilitate operative communication of transport container (50a) with transport channel (44) and bin (46), and additionally includes a laterally disposed ventilation channel (41), to permit air circulation within return chamber (40a) simultaneously with movement of transport container (50a) within return chamber (40a). In an alternative embodiment of the present invention (not shown), transport container (50a) may be loaded with material via transport channel (44) and bin (46) while transport container (50a) remains within return chamber (40a).

Transport container (50a) includes an internally disposed partition (56) to maintain transported materials or objects along the lower longitudinal portion of transport container (50a), and thereby diminish contact between the outer surface of transport container (50a) and the inner surface wall of delivery chamber (60) during elevation of transport container (50a) within delivery chamber (60).

In a fourth embodiment, the elevation apparatus (10) is as described with respect to the third embodiment, but includes the tripartite cavity structure described above.

FIG. 15 depicts a preferred mechanism that may be employed in the present invention to lower transport containers (50) within delivery chamber (40). Multiple collapsed transport containers (50) are shown in a bucket, skip or other such container. Multiple transport containers (50) may be lowered within return chamber (40) simultaneously, or transport containers (50) may be lowered within return chamber (40) individually.

FIGS. 16 and 17 depict alternative embodiments of the present invention, wherein elevation apparatus (10) of the present invention may be employed above ground in a vertical orientation (FIG. 16) or an angled orientation (FIG. 17). Elevation apparatus (10) may be positioned above ground, such as over a mountain pass or other such environmental elevation, to facilitate lifting objects over or beyond such environmental elevations. For instance, transport container (50) may be elevated within chamber framework (30) from a valley floor, above the surface of the ground, to a pass in a mountain range. Under such circumstances, often an elevated fluid source (e.g. water) exists on the flanks of the pass where water can be applied to replace the small amount of water released when transport container (50) is introduced on the valley floor. Preferably, at the lower end of elevation apparatus (10) in an above ground environment, pumping excess or standing fluid may not be necessary since such fluid may be released into a natural drainage location.

In a similar fashion, elevation apparatus (10) may be employed above ground along a vertical cliff or the side of a building or other standing structure to transport objects above ground within elevation apparatus (10). The structural and operational components for elevation apparatus (10) situated above ground, as opposed to beneath the earth's surface, are substantially similar to the components described above in detail in conjunction with the previous embodiments. However, as depicted in FIGS. 16 and 17, the journey of transport container (50) begins above ground and ends above ground.

Figure 18:
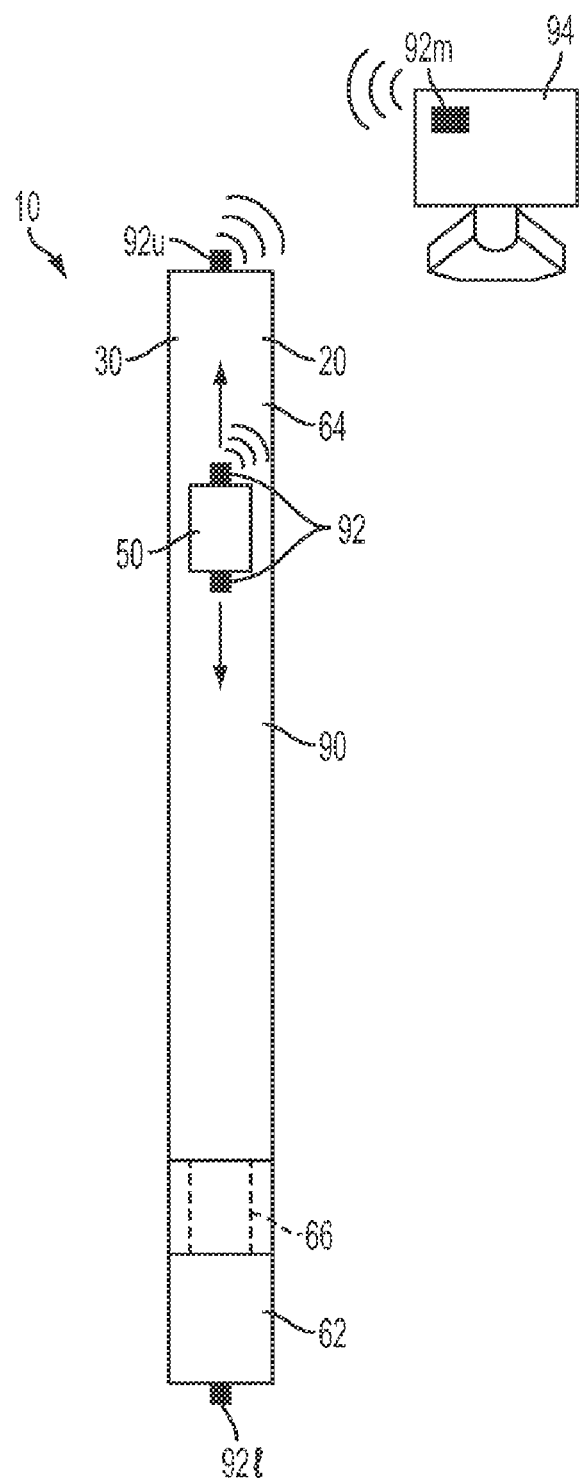
FIG. 18 depicts a front view of the present invention showing a single cavity structure including a fluid-filled transportation chamber.

FIG. 18 shows an embodiment of elevation apparatus (10) of the present invention including a fluid-filled single cavity structure for lifting operation. The structural and operational components for elevation apparatus (10) in this single cavity structure embodiment (as opposed to dual and tripartite cavity structures) are substantially similar to the components described above in detail in conjunction with the previous embodiments, and therefore are referred to by the same reference numerals as discussed above. As shown, shaft elevation structure (20) is situated in vertical orientation to move transport containers (50) having animate or inanimate objects from the lower end of transportation chamber (90) to the upper end of transportation chamber (90), and move transport container (50) back to the lower end of transportation chamber (90) for reloading. Shaft elevation structure (20) may also be arranged in a sloped or inclined orientation to facilitate transporting objects at an angle within chamber framework (30) on a graded incline, as opposed to in a vertical orientation. Chamber framework (30) includes a single cavity structure including transportation chamber (90) and transport container (50) in operative communication with chamber framework (30). Transportation chamber (90) may be configured such that, in operation, it is substantially similar to delivery chamber (60) and return chamber (40) combined (as described in detail below), which results in flotation elevation of transport container (50) as in delivery chamber (60) of the previous embodiments. Additionally, in contrast to the previous embodiments, transportation chamber (90) facilitates lowering or returning of transport containers (50) in a fluid disposed within transportation chamber (90) by sinking the containers at a moderate speed, instead of using hoist, wire pulley, or other similar mechanisms. Therefore, by using fluid buoyancy for both elevating and lowering transporting containers (50) in elevation apparatus (10), the dangers and high maintenance costs required for traditional wire ropes hoisting systems may be eliminated.

Structurally, transportation chamber (90) may be substantially similar to delivery chamber (60) and therefore may include a lower chamber section (62), an upper chamber section (64) and fluid control valve (66). Transportation chamber (90) (and in particular, lower section 62) may be constructed to facilitate operative communication of transport container (50) with transport channel (44) and bin (46) (not shown) to load material while transport container (50) remains within lower chamber (62) of transportation chamber (90). In an alternative embodiment, transport container (50) may be filled by gravity from an ore chute (not shown) while transport container (50) still is in transportation chamber (90). At the upper end of the transportation chamber (90), transport container (50) may be unloaded as described for previous embodiments. Alternatively, for unloading, transportation container (50) is locked into position by a control system, the fluid in the transportation chamber is lowered slightly to the level of the lower material in transport container (50), and the material is unloaded through a chute through portals in transport container (50) and upper chamber (64) (also not shown). To facilitate elevation of the heavy materials in the loaded transport container (50) to ride higher in the fluid within transportation chamber (90), container (50) may be loaded such that at least part of the material being transported is higher than a lower unfilled buoyant part of transport container (50).

In this embodiment, a location device (92) is releasably secured and operatively connected with the transportation container (50) to send, receive, or send and receive location or position information of transport container (50) travelling within transportation chamber (90) to monitoring station (94) including a similar location device (92m), or to one or more of other location devices (92u, 92l) operatively connected to other sections of transportation chamber (90) or transport container (50). Location devices (92) may be configured to function as location or position tracking systems, which are capable of wirelessly transmitting and receiving location information to and from a monitoring station or other similar location devices. Each location device (92) may store an identification code unique to that location device (92), and generates a position or location signal to be transmitted to monitoring station (94) to inform about its location (and therefore, inform about the location of the transport container (50) with which it is attached).

Figure 18A:
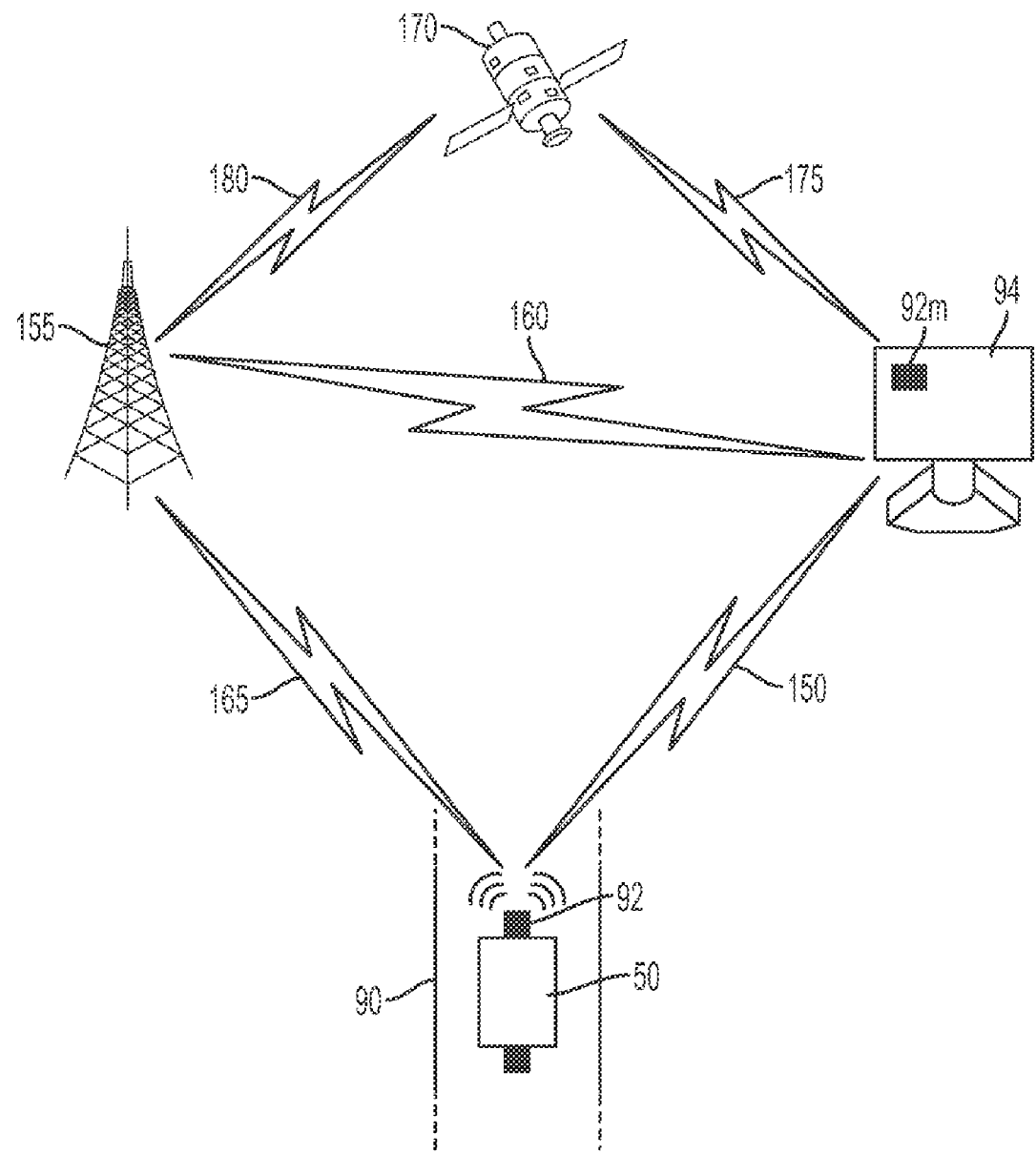
FIG. 18a depicts a system to obtain location information of a transport container using a location device attached therewith.

FIG. 18a depicts a system to obtain location information from location device (92) connected with a transport container (50) travelling within a transportation chamber (90). In the system shown in FIG. 18a, an operator may configure monitoring station (94) to send messages (periodically or at command of the operator) including unique identification codes to one or more of the plurality of location devices (92) requesting their respective location information to keep track of transport containers (50) in the transportation chamber (90). The messages may be sent directly from monitoring station (94) to location device (92) as shown in link (150), or indirectly through a relay (155) using links (160) and relay (155) further transmits messages to location device (92) through link (165). Based on the distance between monitoring device (94) and location device (92), monitoring device (94) may utilize a satellite (170) to transmit messages to location device (92) using link (175). Satellite (170) further transmits messages received from monitoring device (94) to relay (155) using link (180) for eventual transmission to location device (92) using link (165). Upon receipt of the messages, each location device (92) compares the identification code (in the message) with its stored identification code. If location device (92) matches its stored identification code with the received identification code, location device (92) generates and transmits a location or position signal to monitoring station (94) via wireless transmission channels (e.g., using cellular communication technology). Location device may transmit location signal directly to monitoring station (94) using existing link (150), or indirectly through relay (155) (using links (165) and (160)) or through relay (155) and satellite (170) (using links (165), (180) and (175)). The operator of the monitoring station (94) may be physically located at monitoring station (94) or may be able to operate monitoring station (94) remotely, e.g., through an Internet connection. Each location device (92) may also able to generate a distress signal for transmission to the monitoring station (94) upon detection of an emergency situation, e.g., mine flooding, or automatically upon breaking of the circuit of location device (92).

Figure 18B:
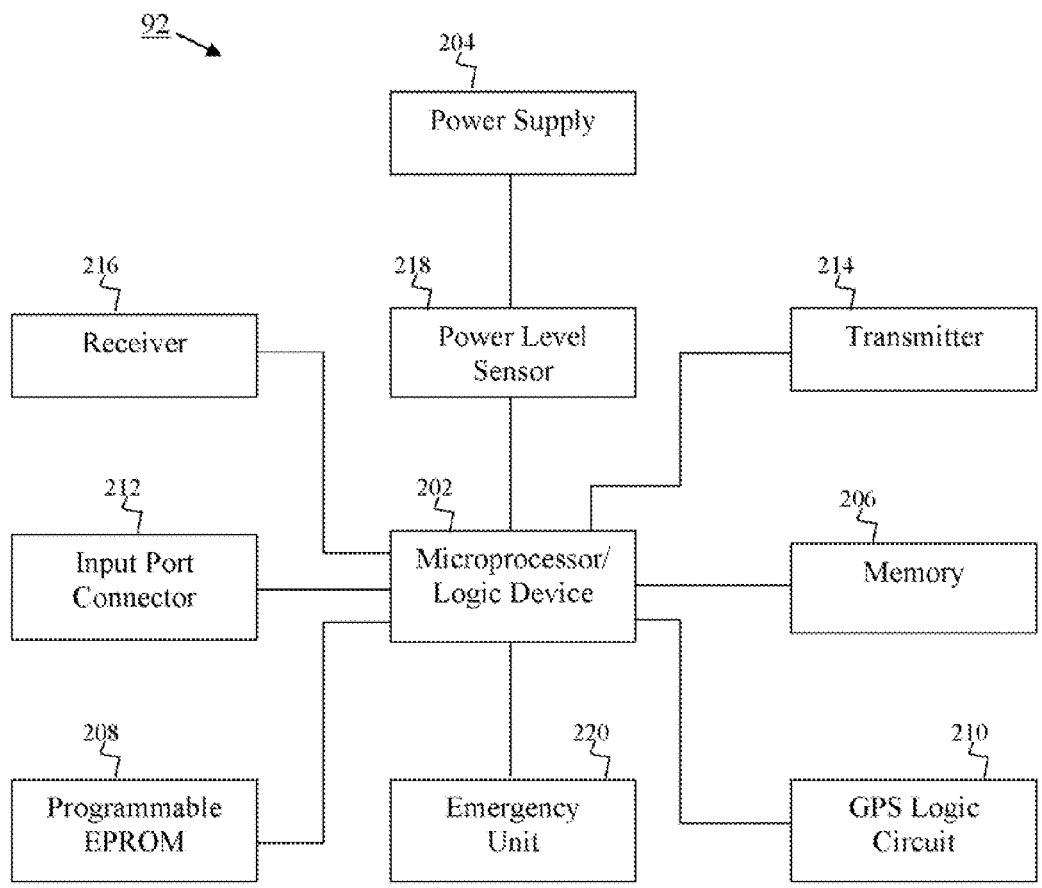
FIG. 18b depicts a schematic block diagram of a location device.

FIG. 18*b* depicts a schematic block diagram of location device (92). As shown in FIG. 18*b*, location device (92) includes a microprocessor/logic device (202). The microprocessor/logic device (202) is connected to receive operating power from a power supply (204). The power supply (204) may be any type of battery which is small enough to fit within the interior of the location device (92) or may even be a solar powered battery for powering the logic device (202). Also connected to the microprocessor/logic device (202) is a memory unit (206) for storing an identification number unique to each location device (94) and storing distress signal information; a programmable EPROM (208) for storing the operating software for the microprocessor/logic device (202) and a Global Positioning Satellite (GPS) logic circuit (210) for use in calculating the longitudinal, latitudinal and elevational position of the location device (92) for transmission to the microprocessor/logic device (202) and ultimate transmission to the monitoring station (94). An input port connector (212) is connected to the microprocessor/logic device (202) for use in inputting the identification information for storage in the memory (206). A transmitter (214) is connected to the microprocessor/logic device (202) for transmission of the identification information, GPS information and distress signals to the monitoring station (94) or relay (155). Transmitter (214) may be a cellular transmitter for transmitting information and signals using existing cellular technology to transmit location information to monitoring station (94) or relay (155). A receiver (216), e.g., a cellular receiver, connected to device (202) allows location device (92) to receive the wireless signals transmitted by the monitoring station (94) in the same manner as a cellular phone or pager, and thus allows an operator to request information about the location of location device (92) by initiating a cellular communication. A power level sensor (218) is connected between the power supply (204) and the microprocessor (202) for sensing the power level of the power supply and providing the sensed power level to the microprocessor (202). The microprocessor (202) generates a power level signal to be transmitted with the signal including location information transmitted by the transmitter (214). An emergency unit (slide switch) (220) is also connected to initiate transmission of the distress signal when activated, e.g., in emergency situations, or when location device (92) becomes unexpectedly detached from transport container (50).

Location device (92) may be made of a cut or temper resistant material so that it is difficult to remove without the proper unlocking mechanism. Preferred materials for use in manufacturing the location device (92) are high tensile strength plastic fiber and stainless steel which will prevent damage to location device (92) when travelling in transportation chamber (90) while attached to transport container (50).

In another embodiment, elevation apparatus (10) is as described with respect to the above embodiment including transportation chamber (90), but further includes an auxiliary hoist chamber (70) as described above, thereby making elevation apparatus a dual cavity structure. In yet another embodiment, elevation apparatus (10) including a single transportation chamber (90) may be used in above-ground operations in a vertical orientation (as discussed and shown in FIG. 16) or in an inclined orientation (as discussed and shown in FIG. 17).

Figure 19:
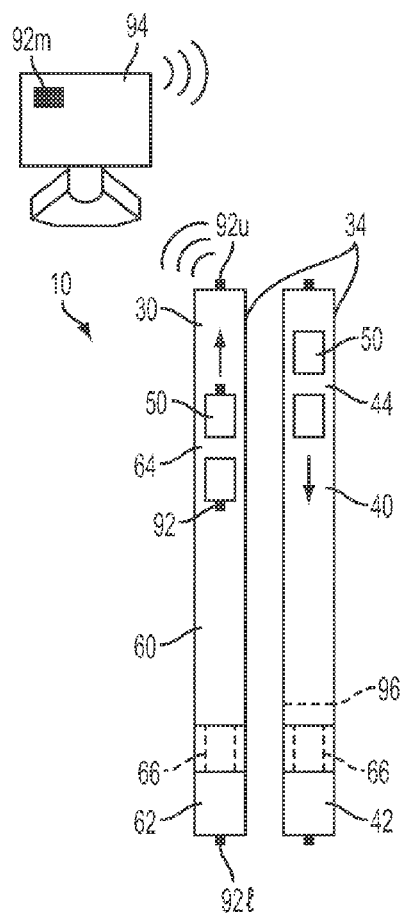
FIG. 19 depicts a front view of the present invention showing a dual cavity structure including a fluid-filled delivery chamber and a fluid-filled return chamber with respective lower chamber sections.

FIG. 19 shows an embodiment of elevation apparatus (10) of the present invention including a dual cavity structure (34) positioned within shaft elevation structure (30). The structural and operational components for elevation apparatus (10) in this dual cavity structure embodiment are substantially similar to the components described above in detail in conjunction with the previous embodiments (e.g., FIG. 2), and therefore are referred to by the same reference numerals as used therein. Dual cavity structure (34) includes delivery chamber (60) and return chamber (40) and transport containers (50). As discussed above, delivery chamber (60) for elevating transport container (50) by flotation includes a lower chamber section (62) disposed internally therein, an upper chamber section (64) and a fluid control valve (66). Fluid control valve (66) controls the amount of fluid and fluid flow within delivery chamber (60). In this embodiment, return chamber (40), unlike some of the embodiments described above, has a fluid disposed therein for lowering transport containers (50) by sinking them in the fluid, thereby eliminating any need for hoist or wire pulley systems to lower transport containers (50). The fluid in return chamber (40) may be same as the fluid (e.g., water) in delivery chamber (60) or a different fluid may be used in return chamber (40). Return chamber (40) may further include a lower section (42), an upper section (44) and fluid control valve (66). Similar to operation in delivery chamber (60), fluid control valve (66) controls fluid flow in return chamber (40).

Figure 19A:
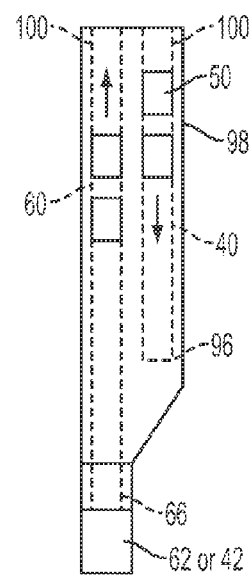
FIG. 19a depicts the dual cavity structure of FIG. 19 including a large chamber and a single lower chamber section.
Figure 19B:
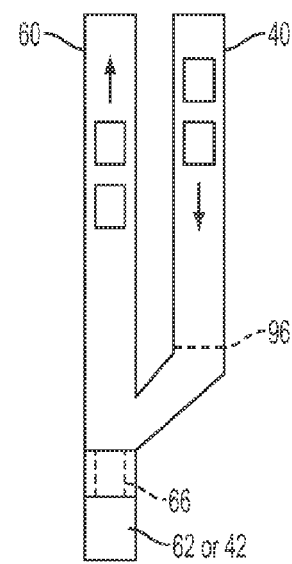
FIG. 19b depicts the dual cavity structure of FIG. 19 including a single lower chamber section for both the delivery and return chambers.
Figure 20:
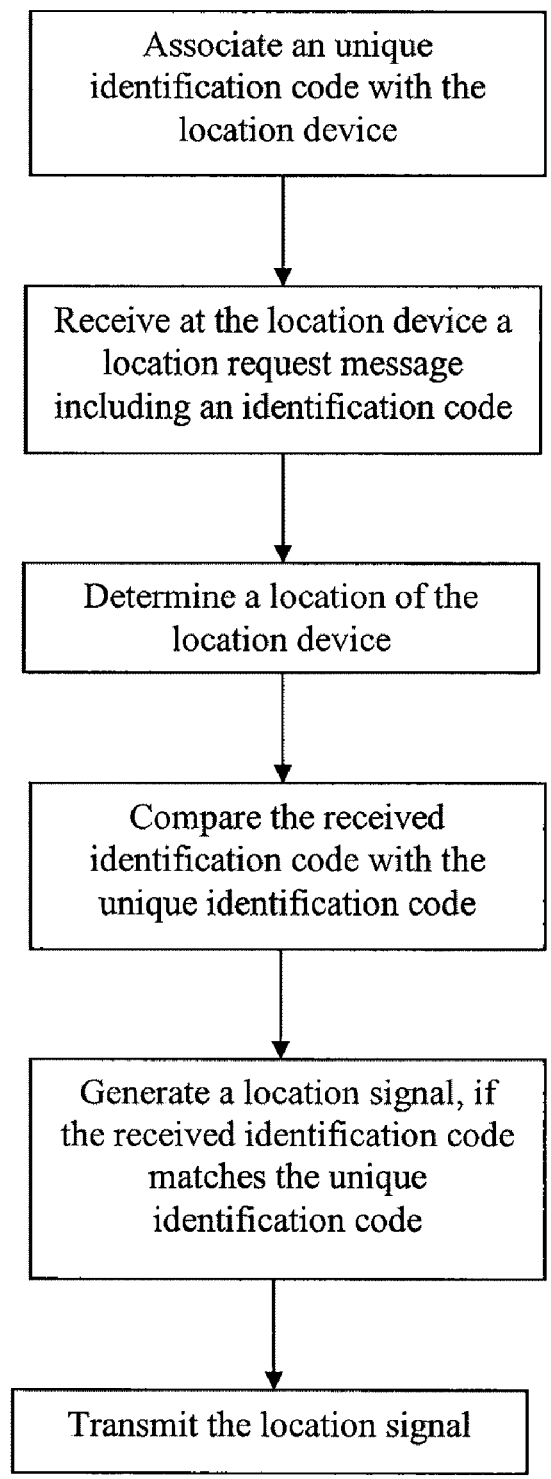
FIG. 20 provides an exemplary flowchart of a method of an embodiment of this disclosure.

FIGS. 19*a* and 19*b* show alternative fluid control and lower chamber section configurations for elevation apparatus (10). FIG. 19*a* shows an embodiment of elevation apparatus (10) including both delivery (60) and return chambers (40) disposed with one large chamber (98) including guides (100) which define an elevation path for transport chamber (50) as delivery chamber (60) and return path for transport chamber (50) as return chamber (40). This embodiment also includes lower chamber section (62 or 42) operatively connected or internally disposed within large chamber (98) such that the lower chamber serves as lower chamber section (62) for the delivery chamber (60) and also lower chamber section (42) for return chamber (40). Fluid control valve (66) controls fluid flow in large chamber (98), thereby controlling fluid flow in both delivery chamber (60) and return chamber (40).

FIG. 19b shows an embodiment of elevation apparatus (10) including delivery chamber (60) and return chamber (40), both of which are operatively connected with a common lower chamber section (62 or 42) and fluid control valve (66).

Return chamber (40) may also include control gate (96) arranged to have relatively short horizontal stops that may screw advancing inward (by electrical motor or other similar device) to stop the returning containers (50) from falling into an occupied lower chamber (42) or falling abruptly into lower chamber (42), which may severely damage returning transport container (50). Multiple control gates (96) may be installed if multiple containers (50) are anticipated to arrive at the lower part of the return route in return chamber (40). An operator may control ingress and egress of transport containers (50) through control gate (96) directly or direct a control system (not shown) to send an appropriate signal to automatically actuate control gate (96) based upon the location and position information of transport containers (50).

In this embodiment, as described in relation to and shown in FIGS. 18, 18a and 18b, a location device (92) is operatively connected with the transportation container (50) to send, receive, or send and receive location information of transport container (50) travelling within delivery chamber (60) or return chamber (40) to a monitoring station (94) including a similar location device (92m), or to one or more of other location devices (92u, 92l) operatively connected to other sections of delivery and return chambers (60, 40) or transport container (50). Location devices (92) may be configured to function as location or position tracking systems, which are capable of wirelessly transmitting and receiving location information to and from a monitoring station or other similar location devices using, e.g. cellular communication technology. Monitoring station (94) may be arranged near the upper surface of delivery chamber (60), near the bottom part of lower chamber section (62, 42), or at remote locations.

Return chamber (40) (and in particular, lower section 42) may be constructed to facilitate operative communication of transport container (50) with transport channel (44) and bin (46) (not shown) to load material while transport container (50) remains within lower chamber (42) of return chamber (40). In an alternative embodiment, transport container (50) may be filled by gravity from an ore chute (not shown) while transport container (50) still is in delivery chamber (60). At the upper end of the delivery chamber (60), transport container (50) may be unloaded as described for previous embodiments.

In another embodiment, elevation apparatus (10) is as described with respect to the above embodiment including fluid-filled delivery chamber (60) and fluid-filled return chamber (40), but further includes an auxiliary hoist chamber (70) as described above, thereby making elevation apparatus (10) a tripartite cavity structure. In yet another embodiment, elevation apparatus (10) as described in relation to and shown in FIG. 19 is used in above-ground or below-ground operations in a vertical orientation (as discussed and shown in FIGS. 2 and 16) or in an inclined orientation (as discussed and shown in FIGS. 14 and 17).

In operation, elevation apparatus (10) of the present invention elevates animate or inanimate objects within chamber framework (30) from beneath the earth's surface or above the earth's surface, including rocks, rock fragments, related mining materials, mining and operational equipment, and the like. Elevation apparatus (10) may be employed to elevate human beings, such as mining personnel, and other animate objects from beneath the earth's surface or above the earth's surface. For instance, elevation apparatus (10) may be used as a means of egress to remove personnel from beneath the earth's surface in a mining emergency situation where a power outage occurs, or under circumstances where limited space becomes available to achieve egress from a mine or other such underground location. In such emergency mining situation in which power supply systems powering apparatus (10) fails, valve (66) and loading system (e.g., as described in FIGS. 5, 6 and 9) for lower chamber (62) may be powered by a local battery power system. Transport containers (50) may be used as escape pods to transport humans to a safe elevation and may be arranged to hold adequate air for the personnel thereon to reach the safe elevation. Although the difference in air pressure between levels corresponding to a safe elevation and to a loading station area near lower chamber (62) may not be particularly harmful, the pressure in transport container (50) may be released gradually through a pressure relief valve, e.g., a hand-turned pressure valve, when transport container (50) containing rescued personnel reaches the surface. Elevation apparatus (10) including at least one fluid-filled chamber as discussed above, may be installed along with a mine shaft structure, e.g., a mine shaft structure including wire rope hoisting to transport objects. In this case, the additional elevation apparatus (10) may be used for transporting personnel safely in emergency situations, e.g., during mine flooding. During such mine flooding situation, the lower part of the shaft and adjacent components associated with the shaft may be sealed off from the flooded area, thereby providing trapped personnel an opportunity to escape from the flooded area using elevation apparatus (10) as described above. Even if the rescued personnel do not reach the top end of the shaft, the miners may reach at a sufficient elevation to access air at the surface of the water and subsequently be rescued from that elevation using other rescuing apparatus and methods.

In some embodiments, at least one of delivery chamber (60), return chamber (40) and transportation chamber (90) of elevation apparatus (10) may be used as a conduit to remove unwanted liquid, e.g., water in a mine.

Subsurface or above surface inanimate or animate objects are elevated within an essentially airtight transport container (50), which moves within chamber framework (30) constructed within shaft elevation structure (20). Transport container (50) may be filled with materials from bin (46), such as rock, rock fragments or any number of inanimate objects requiring transport. For elevation within delivery chamber (60), transport container (50) is filled with material in a manner such that the density of transport container (50) containing material is less than the density of fluid (65) in fluid filled deliver chamber (60) in order to generate sufficient buoyancy to elevate transport container (50) and its contents within chamber framework (30). In embodiments described above which include fluid-filled return chamber (40) to lower transport container (50) by sinking, transport container (50) ready for return in return chamber (40) is filled with a liquid (e.g., water) such that the overall density of transport container (50) is more than the density of fluid in return chamber (40) in order for transport container to descend by sinking in the fluid in return chamber (40). Typically, the composition and geometry of transport container (50) takes into account the density of the material transported. Where extraordinarily dense material is being transported, the container may have some buoyancy either integrated into the structure or separately available, of varying sizes and separately deployable as a function of the material's specific gravity vis-à-vis the fluid (65) specific gravity, and transport container (50) and its buoyancy modifiers. Buoyancy modifiers may append an exterior of transport container (50) or be placed interiorly. For efficient transportation of material and transport containers (50), an operator may use a load cell (operatively connected to elevation apparatus (10)) to fill and detect a predetermined weight that will provide transport container (50) a desirable positive buoyancy for elevation in delivery chamber (60). Similarly, the operator may also determine the desired negative buoyancy before returning the container with the load cell to control the speed at which transport container is lowered in return chamber (40).

After transport container (50) is filled with material from bin (46) through transport channel (44), transport container (50) is sealed and guided into lower chamber section (62) of delivery chamber (60). Lower chamber section (62) is positioned below fluid control valve (66) within delivery chamber (60). Transport container (50) is guided into lower chamber section (62) by a positioning device, such as a lateral conveyor (67), a ram (67a), a shuttle tram (81) or other such positioning devices designed to secure and mobilize objects from one location to an alternate location. Transport container (50) is then held in place within lower chamber section (62) by a locking device (not shown) securely attached near the bottom portion of lower chamber section (62).

Figure 13:
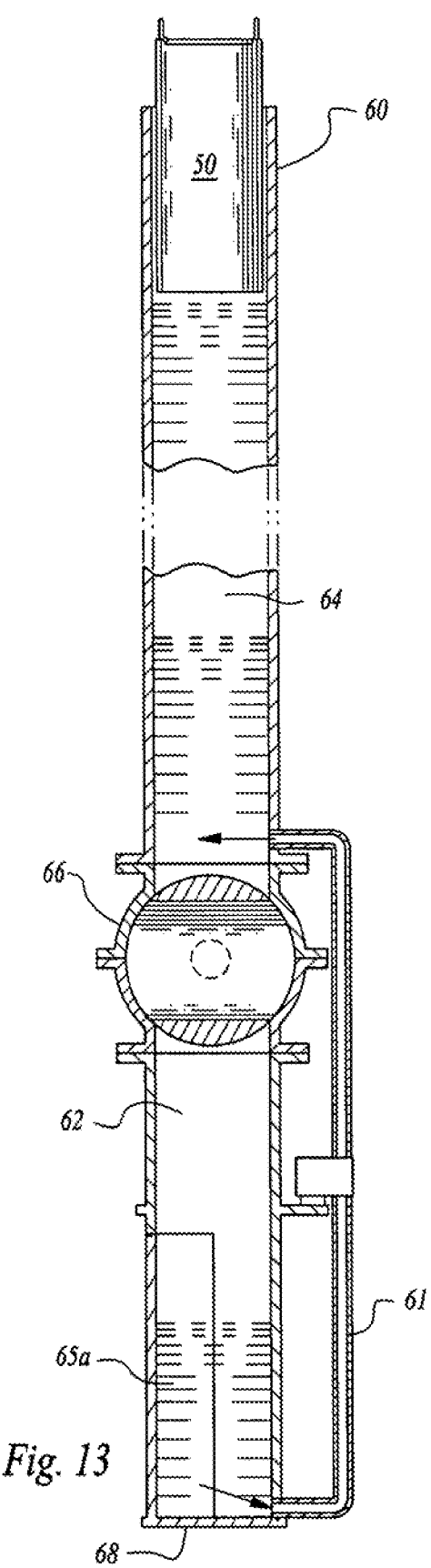
FIG. 13 depicts a side full cross section of a delivery chamber of the present invention showing a valve in a closed position and water being transferred to an upper chamber section according to the present invention.

With filled transport container (50) securely stationed within lower chamber section (62) of deliver chamber (60), lower chamber hatch (68) is then closed and fluid control valve (66) is opened, which allows fluid to enter into lower chamber section (62) from upper chamber section (64) until transport container (50) floats above fluid control valve (66). When transport container (50) floats upwardly past fluid control valve (66), fluid control valve (66) is then closed, and lower chamber hatch (68) is opened to release any residual amount of fluid (65a) remaining in lower chamber section (62). Fluid replacement within upper chamber section (64) of delivery chamber (60) may or may not be necessary, depending upon fluid availability at a particular site or in a particular environment. If necessary, replacement fluid may be added through the top opening of upper chamber section (64) of delivery chamber (60) by pumping or other available fluid transport devices. As depicted in FIG. 13, residual fluid (65a) may alternatively be re-circulated from lower chamber section (62) into upper chamber section (64) by re-circulation pipe (61) in order to replenish fluid within upper chamber section (64) of delivery chamber (60).

Residual fluid (65a) remaining in lower chamber section (62) of deliver chamber (60) flows away from shaft elevation structure (20) or may be removed by fluid pumping equipment (not shown). Alternatively, lower chamber hatch (68) of lower chamber section (62) may operatively communicate with an externally disposed drain facility (not shown), which would obviate the need for pumping residual fluid (65a). In an alternative embodiment of the present invention (not shown), delivery chamber (60) may itself be used as a conduit for pumping fluid upward within chamber framework (30), with or without transport container (50) present, particularly in circumstances where a drainage area is not available for residual fluid (65a).

When elevation apparatus (10) is positioned above ground, such as over a mountain pass with a fluid source higher on one flank of the pass, fluid may be fed from the high flank into upper chamber section (64) of delivery chamber (60), and subsequently released onto the valley floor when lower chamber hatch (68) of lower chamber section (62) of delivery chamber (60) is opened.

After transport container (50) floats to the top of upper chamber (64) of delivery chamber (60), transport container (50) may be connected to upper shuttle tram (84), which guides transport container (50) to a stockpile (82) or other such desirable surface location at which the contents of transport container (50) are released. Upper shuttle tram (84) releases the contents of transport container (50), and may employ at least one tine as previously described with respect to lower shuttle tram (81), whereupon a pincer type arm girds transport container (50) for hoisting, inversion, and disgorgement of transport container (50) contents. As an alternative to employing a shuttle tram (84) to position transport container (50) for dumping or otherwise releasing its contents onto stockpile (82) or other desired surface location, a tipple system (not shown) may be employed to position transport container (50) for emptying.

After its contents are emptied, transport container (50) is then guided toward and lowered into return chamber (40) to retrieve or deliver another load of materials or objects or to repeat the cycle described above. Transport container (50) may descend within return chamber (40) with transport container (50) either empty, filled with material to transport within chamber framework (30), or in a collapsed form. Transport containers (50) may be transported within return chamber (40) by a hoist, or haulage vehicle, or other such mechanism for controlling the decent velocity of transport containers (50) within return chamber (40). Several collapsed transport containers (50) may be placed in a bucket, skip, cage, or similar housing and lowered within return chamber (40) simultaneously, or transport containers (50) may be lowered within return chamber (40) one at a time. Alternatively, the descent velocity of transport container (50) within return chamber (40) may be modulated by an air compression device (not shown) operatively attached to shaft elevation structure (20) or an internally disposed braking system (not shown).

An auxiliary surface hoist (72) is depicted in FIG. 1 in conjunction with auxiliary hoist chamber (70) and may be employed as an emergency, maintenance, personnel or otherwise alternative elevation device for ingress or egress of animate or inanimate objects within chamber framework (30). Alternatively, delivery chamber (60) and transport container (50) of shaft elevation structure (20) may be employed to elevate personnel and other animate objects within chamber framework (30) in various circumstances, including mining emergencies, power failures and the like.

In an incline elevation environment, elevation shaft structure (20), and chamber framework (30) operate in essentially the same fashion as described above. As depicted in FIG. 14, chamber framework (30) includes a dual cavity structure (34), incorporating return chamber (40a) and fluid filled deliver chamber (60). Return chamber (40a) is depicted incorporating a laterally and adjacently disposed ventilation channel (41), which facilitates ventilation within return chamber (40a) simultaneously with the movement of transport container (50a) within return chamber (40a). An alternative to employing return chamber (40a) for returning transport containers (50a) back within chamber framework (30) is use of truck haulage units to return transport containers (50a) within chamber framework (30) for loading or unloading.

Transport container (50a) includes an internally disposed partition (56), which maintains rock or other transported material on the lower longitudinal portion of transport container (50a) as transport container (50a) is elevated at an incline angle within delivery chamber (60). Partitioning transported material to remain along the lower longitudinal portion of transport container (50a) helps to minimize contact between the outer surface of transport container (50a) and the inner surface wall of delivery chamber (60) as transport container (50a) is elevated within delivery chamber (60) at an angle. Preferably, the angle of elevation should be greater than 20 degrees and preferably 45 degrees, plus or minus 15 degrees.

In elevation apparatus (10) described with respect to and shown in FIG. 18, transport container (50) is partially filled with animate or inanimate objects (so as to retain positive buoyancy in transportation chamber (90)), adjacent to or directly under a vertical or inclined transportation chamber (90). Transport container (50) is sealed and placed in lower chamber section (62), fluid control valve (66) is opened, thereby flooding lower chamber section (62) with fluid from upper section (64), and as a result transport container (50) rises up in transportation chamber (90) through fluid control valve (66) to the surface co-planar with the upper end of transportation chamber (90). Fluid control valve (66) may be left open and lower chamber hatch (68) is left closed as transport container (50) elevates through transportation chamber (90) so that fluid level in transportation chamber (90) is retained for subsequent lowering of transport containers (50) in the same fluid.

At the top of transportation chamber (90), container (50) is emptied just above or adjacent to transportation chamber (90), and then partially filled with a liquid (e.g., water) or other material to prepare container (50) to have negative buoyancy to sink down through the fluid in transportation chamber (90). Transport container (50) may sink down at a moderate rate through upper chamber (64) and fluid control valve (66) to the bottom of the sealed lower chamber section (62). At the end of the hoisting cycle, fluid control valve (66) is closed, and lower chamber section (62) and container (50) is drained for preparation of the next hoisting cycle. In this embodiment, processes such as loading/unloading processes described above can also be integrated herewith.

In elevation apparatus (10) described with respect to and shown in FIG. 19, transport container (50) is partially filled with animate or inanimate objects (so as to retain positive buoyancy in delivery chamber (60)), adjacent to or directly under a vertical or inclined delivery chamber (60). Transport container (50) is sealed and placed in lower chamber section (62), fluid control valve (66) is opened, thereby flooding lower chamber section (62) with fluid from upper section (64), and as a result transport container (50) rises up in delivery chamber (60) through fluid control valve (66) to the surface co-planar with the upper end of delivery chamber (60). When transport container (50) floats upwardly past fluid control valve (66), fluid control valve (66) is then closed, and lower chamber hatch (68) is opened to release any residual amount of fluid remaining in lower chamber section (62). Fluid replacement within upper chamber section (64) of delivery chamber (60) may or may not be necessary, depending upon fluid availability at a particular site or in a particular environment. If necessary, replacement fluid may be provided as described above.

At the top end of upper chamber section (64), transport container (50) is emptied just above or adjacent to delivery chamber (60), and then partially filled with a liquid (e.g., water) or other material to prepare container (50) to have negative buoyancy to sink down through the fluid in return chamber (40). Transport container (50) is then placed in fluid-filled return chamber (40), and allowed to sink back down at a moderate rate through upper chamber (44) and fluid control valve (66) to the bottom of the sealed lower chamber section (42) of return chamber (40). At the end of the hoisting cycle, fluid control valve (66) of return chamber (40) is closed, and lower chamber section (42) and container (50) is drained for preparation of the next hoisting cycle. In this embodiment, processes such as loading/unloading processes described above can also be integrated herewith.

Having thus described the invention, it should be apparent that numerous structural modifications and adaptations may be resorted to without departing from the scope of the present invention as set forth hereinabove and as defined below by the claims.

I claim:

1. An apparatus configured for bidirectionally conveying objects comprising:
    a transport container containing one or more objects; and
    a transportation chamber having upper and lower outlets for transporting the transport container in a chamber liquid internally disposed within the transportation chamber,
    wherein the apparatus is configured to elevate the transport container to the upper outlet by flotation and lower to the lower outlet the transport container by sinking in the chamber liquid to convey objects,
    wherein the transport container is airtight to allow the transport container to elevate by floatation in the chamber liquid,
    wherein said lower outlet is under said upper outlet and comprises an airlock to control ingress into, and egress from, the transport chamber.

2. The apparatus of claim 1, further comprising a loader for loading objects into the transport container.

3. The apparatus of claim 2, wherein the loader is operatively engaged with the transportation chamber and comprises an object storage and a channel configured to transfer objects from the storage through the channel into the transport container.

4. The apparatus of claim 3, further comprising a guiding device configured to guide the transport container.

5. The apparatus of claim 4, wherein the guiding device is horizontally disposed within a bottom portion of a conveyor in operative communication with the transportation chamber and the transport container.

6. The apparatus of claim 1, further comprising an auxiliary chamber laterally disposed to the transportation chamber for transporting objects.

7. The apparatus of claim 1, wherein the transportation chamber comprises a vertically disposed cavity.

8. The apparatus of claim 1, further comprising a fluid controller internally disposed within the transportation chamber and configured to control an amount of the chamber liquid in the transportation chamber to elevate and lower the transport container within the transportation chamber.

9. The apparatus of claim 8, wherein the fluid controller comprises a lower chamber internally disposed within the transportation chamber, and a valve configured to control the amount of the chamber liquid in the lower chamber.

10. The apparatus of claim 1, wherein the transport container comprises a moveable lid configured to seal the transport container.

11. The apparatus of claim 1, further comprising a first location device operatively connected with the transportation container and configured to communicate location information of the transport container between the first location device and a second location device.

12. A method for bidirectionally transporting objects comprising:
    providing a transport container;
    loading the transport container with one or more objects;
    elevating the transport container containing the one or more objects in a chamber liquid internally disposed within a transportation chamber having upper and lower outlets, wherein the transport container is airtight to allow the transport container to elevate to the upper outlet by floatation in the chamber liquid;

unloading the transport container; and lowering the transport container by sinking the transport container in the chamber liquid within the transportation chamber to the lower outlet, wherein said lower outlet is under said upper outlet and comprises an airlock to control ingress into, and egress from, the transport chamber.

13. The method of claim 12, further comprising loading objects into the transport container using a loader.

14. The method of claim 13, wherein the loader operatively engaged with the transportation chamber and comprises an object storage and a channel configured to transfer objects from the storage through the channel into the transport container.

15. The method of claim 14, further comprising guiding the transport container using a guiding device.

16. The method of claim 15, wherein the guiding device is horizontally disposed within a bottom portion of a conveyor in operative communication with the transportation chamber and the transport container.

17. The method of claim 12, wherein the transportation chamber comprises a vertically disposed cavity.

18. The method of claim 12, further comprising controlling an amount of the chamber liquid in the transportation chamber using a fluid controller operatively associated with the transportation chamber.

19. The method of claim 18, wherein the fluid controller comprises a lower chamber internally disposed within the transportation chamber, and a valve configured to control the amount of the chamber liquid in the lower chamber.

20. The method of claim 12, wherein the transport container comprises a moveable lid configured to seal the transport container.

21. The method of claim 12, further comprising communicating, using a first location device operatively connected with the transportation container, location information of the transport container between the first location device and a second location device.

22. An apparatus configured for bidirectionally conveying objects comprising:

a transport container containing one or more objects;

a delivery chamber having an upper and lower outlets for elevating the transport container from the lower outlet to the upper outlet by flotation in a first chamber liquid internally disposed within the delivery chamber, wherein the transport container is airtight to allow the transport container to elevate by floatation in the first chamber liquid; and a return chamber for lowering the transport container by sinking in a second chamber liquid internally disposed within the return chamber, wherein said lower outlet is under said upper outlet and comprises an airlock to control ingress into, and egress from, the delivery chamber.

23. The apparatus of claim 22, wherein the return chamber further comprises a control gate to regulate a downward movement of the transport container within the return chamber.

24. The apparatus of claim 22, further comprising a loader for loading objects into the transport container.

25. The apparatus of claim 24, wherein the loader is operatively engaged with the return chamber and comprises an object storage and a channel configured to transfer objects from the storage through the channel into the transport container.

26. The apparatus of claim 25, further comprising a guiding device configured to guide the transport container.

27. The apparatus of claim 26, wherein the guiding device is horizontally disposed within a bottom portion of a conveyor in operative communication with the return chamber, the transport container, and the delivery chamber.

28. The apparatus of claim 22, further comprising an auxiliary chamber laterally disposed to the delivery chamber or the return chamber.

29. The apparatus of claim 22, wherein the return chamber comprises a vertically disposed cavity.

30. The apparatus of claim 22, further comprising a delivery device comprising a cavity laterally disposed to the return chamber, wherein the delivery device is configured to receive the transport container from the return chamber and wherein the delivery device is equipped to facilitate elevation of the transport container into the delivery chamber.

31. The apparatus of claim 22, further comprising a fluid controller internally disposed within the delivery chamber, the return chamber, or both, and configured to control the amount of the chamber liquid in the chamber within which the fluid controller is disposed to elevate or lower the transport container.

32. The apparatus of claim 31, wherein the fluid controller comprises a lower chamber internally disposed within the chamber within which the fluid controller is disposed, and a valve configured to control the amount of the chamber liquid in the lower chamber.

33. The apparatus of claim 22, wherein the transport container comprises a moveable lid configured to seal the transport container.

34. The apparatus of claim 22, further comprising a first location device operatively connected with the transportation container and configured to communicate location information of the transport container between the first location device and a second location device.

35. A method for bidirectionally transporting objects comprising:

providing a transport container;

loading one or more objects into the transport container;

elevating the transport container by flotation in a first chamber liquid internally disposed within a delivery chamber having upper and lower outlets, wherein the transport container is airtight to allow the transport container to elevate from the lower outlet to the upper outlet by flotation in the first chamber liquid;

unloading the transport container; and lowering the transport container by sinking in a second chamber liquid internally disposed within a return chamber, wherein said lower outlet is under said upper outlet and comprises an airlock to control ingress into, and egress from, the delivery chamber.

36. The method of claim 35, wherein the return chamber further comprises a control gate to regulate the downward movement of the transport container within the return chamber.

* * * * *